(12) United States Patent
Koga et al.

(10) Patent No.: US 11,710,356 B2
(45) Date of Patent: *Jul. 25, 2023

(54) SYSTEMS AND METHODS FOR A VIRTUAL REFUSE VEHICLE

(71) Applicant: Oshkosh Corporation, Oshkosh, WI (US)

(72) Inventors: Jeffrey Koga, Oshkosh, WI (US); Cody D. Clifton, Mapleton, MN (US); Zhenyi Wei, Oshkosh, WI (US); Grant Wildgrube, Fairbault, MN (US)

(73) Assignee: Oshkosh Corporation, Oshkosh, WI (US)

( * ) Notice: Subject to any disclaimer, the term of this patent is extended or adjusted under 35 U.S.C. 154(b) by 166 days.

This patent is subject to a terminal disclaimer.

(21) Appl. No.: 17/220,585

(22) Filed: Apr. 1, 2021

(65) Prior Publication Data

US 2021/0225095 A1 Jul. 22, 2021

Related U.S. Application Data

(63) Continuation of application No. 17/007,201, filed on Aug. 31, 2020, now Pat. No. 10,997,802, which is a continuation of application No. 16/789,962, filed on Feb. 13, 2020, now Pat. No. 11,380,145.

(60) Provisional application No. 62/805,763, filed on Feb. 14, 2019.

(51) Int. Cl.
  *G07C 5/00* (2006.01)
  *G07C 5/02* (2006.01)
  *G05B 17/02* (2006.01)
  *G05D 1/00* (2006.01)
  *G05D 1/02* (2020.01)
  *G07C 5/08* (2006.01)

(52) U.S. Cl.
  CPC ............... *G07C 5/02* (2013.01); *G05B 17/02* (2013.01); *G05D 1/0016* (2013.01); *G05D 1/0291* (2013.01); *G07C 5/008* (2013.01); *G07C 5/08* (2013.01)

(58) Field of Classification Search
  CPC . G07C 5/02; G07C 5/008; G07C 5/08; G07C 5/085; G07C 5/00; G05B 17/02; G05D 1/0016; G05D 1/0291; G05D 1/00
  See application file for complete search history.

(56) References Cited

U.S. PATENT DOCUMENTS

| | | |
|---|---|---|
| 5,046,007 A | 9/1991 | McCrery et al. |
| 5,304,744 A | 4/1994 | Jensen |
| 5,631,835 A | 5/1997 | Hagenbuch |
| 5,644,489 A | 7/1997 | Hagenbuch |
| 5,919,027 A | 7/1999 | Christenson |
| 5,934,858 A | 8/1999 | Christenson |
| 5,934,867 A | 8/1999 | Christenson |

(Continued)

*Primary Examiner* — Yonel Beaulieu
(74) *Attorney, Agent, or Firm* — Foley & Lardner LLP

(57) ABSTRACT

A system for digital twinning a refuse vehicle includes a refuse vehicle, and a controller. The controller is configured to receive multiple datasets from the refuse vehicle, and generate a virtual refuse vehicle based on the multiple datasets. The virtual refuse vehicle includes a visual representation of the refuse vehicle and the multiple datasets. The controller is further configured to operate a display of a user device to provide the visual representation of the refuse vehicle and one or more of the multiple datasets to a user.

20 Claims, 13 Drawing Sheets

(56) References Cited

U.S. PATENT DOCUMENTS

| | | |
|---|---|---|
| 5,938,394 A | 8/1999 | Christenson |
| 5,951,235 A | 9/1999 | Young et al. |
| 5,967,731 A | 10/1999 | Brandt |
| 5,984,609 A | 11/1999 | Bartlett |
| 5,995,888 A | 11/1999 | Hagenbuch |
| 6,033,176 A | 3/2000 | Bartlett |
| 6,062,803 A | 5/2000 | Christenson |
| 6,089,813 A | 7/2000 | McNeilus et al. |
| 6,120,235 A | 9/2000 | Humphries et al. |
| 6,123,500 A | 9/2000 | McNeilus et al. |
| 6,213,706 B1 | 4/2001 | Christenson |
| 6,224,318 B1 | 5/2001 | McNeilus et al. |
| 6,310,094 B1 | 10/2001 | Liu et al. |
| 6,315,515 B1 | 11/2001 | Young et al. |
| 6,336,783 B1 | 1/2002 | Young et al. |
| 6,350,098 B1 | 2/2002 | Christenson et al. |
| 6,447,239 B2 | 9/2002 | Young et al. |
| 6,474,928 B1 | 11/2002 | Christenson |
| 6,565,305 B2 | 5/2003 | Schrafel |
| 7,070,382 B2 | 7/2006 | Pruteanu et al. |
| 7,284,943 B2 | 10/2007 | Pruteanu et al. |
| 7,556,468 B2 | 7/2009 | Grata |
| 7,559,735 B2 | 7/2009 | Pruteanu et al. |
| 7,620,703 B1 | 11/2009 | Shteyn |
| 7,878,750 B2 | 2/2011 | Zhou et al. |
| 7,882,683 B2 | 2/2011 | Studer et al. |
| 8,182,194 B2 | 5/2012 | Pruteanu et al. |
| 8,215,892 B2 | 7/2012 | Calliari |
| 8,360,706 B2 | 1/2013 | Addleman et al. |
| 8,540,475 B2 | 9/2013 | Kuriakose et al. |
| 8,807,613 B2 | 8/2014 | Howell et al. |
| 9,216,856 B2 | 12/2015 | Howell et al. |
| 9,387,985 B2 | 7/2016 | Gillmore et al. |
| 9,579,969 B2 | 2/2017 | Crist et al. |
| 9,694,671 B2 | 7/2017 | Wildgrube et al. |
| 9,731,594 B2 | 8/2017 | Wildgrube |
| 9,880,581 B2 | 1/2018 | Kuriakose et al. |
| 9,981,803 B2 | 5/2018 | Davis et al. |
| 10,106,032 B2 | 10/2018 | Crist et al. |
| 10,152,739 B2 | 12/2018 | Mansfield et al. |
| 10,196,205 B2 | 2/2019 | Betz et al. |
| 10,414,067 B2 | 9/2019 | Datema et al. |
| 10,457,533 B2 | 10/2019 | Puszkiewicz et al. |
| 10,558,234 B2 | 2/2020 | Kuriakose et al. |
| 10,766,696 B2 | 9/2020 | Whitfield et al. |
| 11,380,145 B2 * | 7/2022 | Koga ............... G07C 5/008 |
| 2004/0133319 A1 | 7/2004 | Pillar et al. |
| 2004/0148083 A1 | 7/2004 | Arakawa et al. |
| 2005/0080520 A1 | 4/2005 | Kline et al. |
| 2008/0275765 A1 | 11/2008 | Kuchar |
| 2014/0214697 A1 | 7/2014 | Mcsweeney |
| 2016/0034998 A1 | 2/2016 | Mansfield et al. |
| 2017/0081120 A1 | 3/2017 | Liu et al. |
| 2017/0102678 A1 | 4/2017 | Nixon et al. |
| 2017/0286570 A1 | 10/2017 | Kim et al. |
| 2017/0341860 A1 | 11/2017 | Dodds et al. |
| 2018/0125289 A1 | 5/2018 | Douglas et al. |
| 2018/0347998 A1 | 12/2018 | Rossi et al. |
| 2019/0047413 A1 | 2/2019 | Crist et al. |
| 2019/0121353 A1 | 4/2019 | Datema et al. |
| 2019/0161272 A1 | 5/2019 | Betz et al. |
| 2019/0193934 A1 | 6/2019 | Rocholl et al. |
| 2019/0259227 A1 | 8/2019 | Oesterling et al. |
| 2019/0286121 A1 | 9/2019 | Bando et al. |
| 2019/0325220 A1 | 10/2019 | Wildgrube et al. |
| 2019/0344475 A1 | 11/2019 | Datema et al. |
| 2019/0360600 A1 | 11/2019 | Jax et al. |
| 2020/0031641 A1 | 1/2020 | Puszkiewicz et al. |
| 2020/0126302 A1 | 4/2020 | Sharma et al. |
| 2020/0262366 A1 | 8/2020 | Wildgrube et al. |
| 2020/0265656 A1 * | 8/2020 | Koga ............... G07C 5/08 |
| 2021/0042940 A1 | 2/2021 | Mitra et al. |
| 2022/0036302 A1 * | 2/2022 | Cella ............... G06Q 10/083 |

* cited by examiner

700

| Vehicle ID No: 111A153B1 | | | | | |
|---|---|---|---|---|---|
| Date: | Time: | Speed: | Latitude: | Longitude: | Fuel Level: |
| 17-10-12 | 06:05:10 | 35 mph | 37.7528 | 100.0171 | 99.5% |
| 17-10-12 | 06:05:20 | 35 mph | 37.7537 | 100.0171 | 99.5% |
| 17-10-12 | 06:05:30 | 34 mph | 37.7546 | 100.0171 | 99.5% |
| 17-10-12 | 06:05:40 | 33 mph | 37.7554 | 100.0171 | 99.4% |
| 17-10-12 | 06:05:50 | 34 mph | 37.7568 | 100.0171 | 99.4% |
| 17-10-12 | 06:06:00 | 35 mph | 37.7578 | 100.0171 | 99.4% |
| 17-10-12 | 06:06:10 | 35 mph | 37.7580 | 100.0171 | 99.4% |
| 17-10-12 | 06:06:20 | 36 mph | 37.7598 | 100.0171 | 99.3% |
| 17-10-12 | 06:06:30 | 35 mph | 37.7608 | 100.0170 | 99.3% |
| 17-10-12 | 06:06:40 | 33 mph | 37.7618 | 100.0170 | 99.3% |
| 17-10-12 | 06:06:50 | 35 mph | 37.7626 | 100.0170 | 99.3% |
| 17-10-12 | 06:07:00 | 35 mph | 37.7638 | 100.0170 | 99.2% |
| 17-10-12 | 06:07:10 | 25 mph | 37.7645 | 100.0170 | 99.2% |
| 17-10-12 | 06:07:20 | 15 mph | 37.7650 | 100.0170 | 99.2% |
| 17-10-12 | 06:07:30 | 1 mph | 37.7658 | 100.0170 | 99.2% |
| 17-10-12 | 06:07:40 | 0 mph | 37.7658 | 100.0170 | 99.2% |
| 17-10-12 | 06:07:50 | 0 mph | 37.7658 | 100.0170 | 99.2% |

FIG. 7

| Vehicle ID No: | Speed: | Latitude: | Longitude: | Fuel Level: | Arm Angle: | Engine RPM: |
|---|---|---|---|---|---|---|
| 111A153B1: | 55 mph | 37.7528 | 100.0171 | 95.4% | 0° | 2501 |
| 111A153B2: | 35 mph | 30.1565 | 101.2451 | 90.8% | 0° | 1815 |
| 111A153B3: | 15 mph | 34.8756 | 99.5679 | 25.8% | 0° | 1200 |
| 111A154C8: | 51 mph | 33.7912 | 105.7898 | 99.4% | 15° | 2490 |
| 111B153D1: | 0 mph | 37.0156 | 101.7982 | 56.8% | 47° | 800 |
| 111A153B8: | 18 mph | 40.7895 | 90.7891 | 43.7% | 0° | 1300 |
| 111A153D5: | 65 mph | 25.4587 | 98.4532 | 30.4% | 0° | 2600 |
| 111A153F1: | 50 mph | 26.5687 | 97.5487 | 88.5% | 0° | 2400 |
| 111A153G7: | 45 mph | 41.1278 | 96.8854 | 78.6% | 0° | 2385 |
| 111B153C4: | 2 mph | 42.4892 | 100.5577 | 90.6% | 0° | 801 |
| 111H153B9: | 0 mph | 38.7954 | 115.4897 | 89.1% | 15° | 800 |

FIG. 11

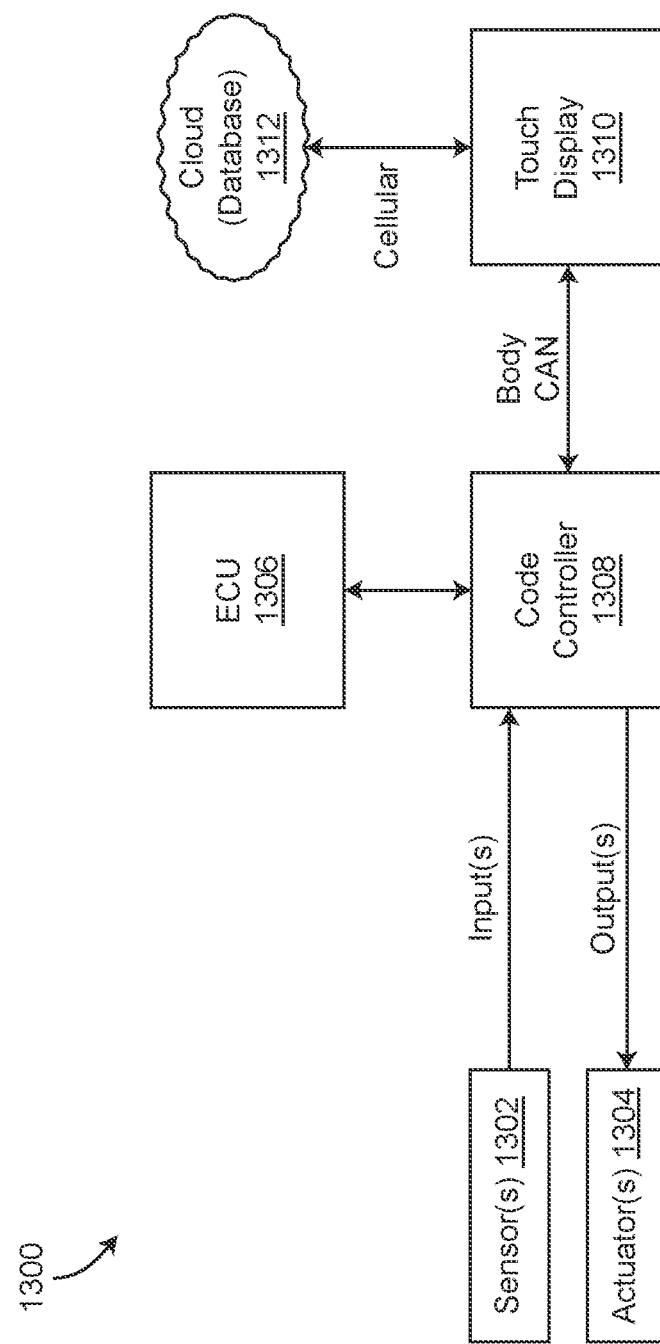

SYSTEMS AND METHODS FOR A VIRTUAL REFUSE VEHICLE

CROSS-REFERENCE TO RELATED PATENT APPLICATION

The present application is a continuation of U.S. patent application Ser. No. 17/007,201, filed Aug. 31, 2020, granted as U.S. Pat. No. 10,997,802 on May 4, 2021, which is a continuation of U.S. patent application Ser. No. 16/789,962, filed Feb. 13, 2020, granted as U.S. Pat. No. 11,380,145 on Jul. 5, 2022, which claims the benefit of and priority to U.S. Provisional Patent Application. No. 62/805,763, filed Feb. 14, 2019, the entire disclosures of which are incorporated by reference herein.

BACKGROUND

The present invention generally relates to the field of refuse vehicles, and in particular, to the field of digital twinning.

SUMMARY

One embodiment of the present disclosure relates to a system for digital twinning a refuse vehicle. The system includes a refuse vehicle, and a controller. The controller is configured to receive multiple datasets from the refuse vehicle, and generate a virtual refuse vehicle based on the multiple datasets. The virtual refuse vehicle includes a visual representation of the refuse vehicle and the multiple datasets. The controller is further configured to operate a display of a user device to provide the visual representation of the refuse vehicle and one or more of the multiple datasets to a user.

Another embodiment of the present disclosure relates to a method for displaying information of a refuse vehicle. The method includes obtaining multiple datasets from a refuse vehicle. The method also includes generating a digital twin of the refuse vehicle, the digital twin including the multiple datasets, and a graphical representation of the refuse vehicle. The method also includes receiving a request, at a user device, to display the digital twin of the refuse vehicle, and operating a display of the user device to provide the graphical representation of the refuse vehicle and one or more of the multiple datasets in response to the request.

Still another embodiment of the present disclosure relates to a cloud computing system for multiple refuse vehicles. The cloud computing system includes a cloud device and a user device. The cloud device includes a processor configured to wirelessly communicate with multiple refuse vehicle controllers to obtain operational data of each of the refuse vehicles. Each of the multiple refuse vehicle controllers are positioned locally at a corresponding refuse vehicle. The processor is also configured to generate a digital twin for each of the multiple refuse vehicles using the operational data. The digital twin includes a graphical representation of the corresponding refuse vehicle. The user device includes a processor and a display. The processor is configured to receive one or more of the digital twins from the processor of the cloud device, and operate the display of the user device to provide the graphical representation of the one or more digital twins and the operational data that corresponds to the one or more digital twins.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which:

FIG. 7 is a tabular depiction of information received by the remote server of FIG. 3, shown in greater detail, according to an exemplary embodiment.

FIG. 11 is a tabular depiction of historical information of the virtual refuse vehicle system of FIG. 9, according to an exemplary embodiment.

FIG. 13 is a diagram of a virtual refuse vehicle system, according to an exemplary embodiment.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the FIGURES, systems and methods for a virtual refuse vehicle system are shown, according to various exemplary embodiments. The virtual refuse vehicle system includes a controller configured to receive information from sensors and/or control units disposed in various locations on a refuse vehicle. The controller may be disposed in any suitable location on the refuse vehicle. The information is received and processed by the controller and transmitted to a remote server via a wireless radio of the controller. The remote server includes a virtual refuse vehicle which receives the information from the controller and models the information on the virtual refuse vehicle. The virtual refuse vehicle acts as a virtual twin of the refuse vehicle, and may be accessed through the remote server by a variety of applications. The virtual refuse vehicle may be accessed by personal computer devices to monitor a live view of the refuse vehicle, and may write time series information of the virtual refuse vehicle to a remote database. In some embodiments, the virtual refuse vehicle may be accessed by a personal computer device with administrative access and may send commands to the controller via the remote server and the wireless radio of the controller. The commands sent to the controller may be commands corresponding to the control units and may adjust an operation of the control units of the refuse vehicle, resulting in an adjusted operation of the refuse vehicle.

Figure 1:
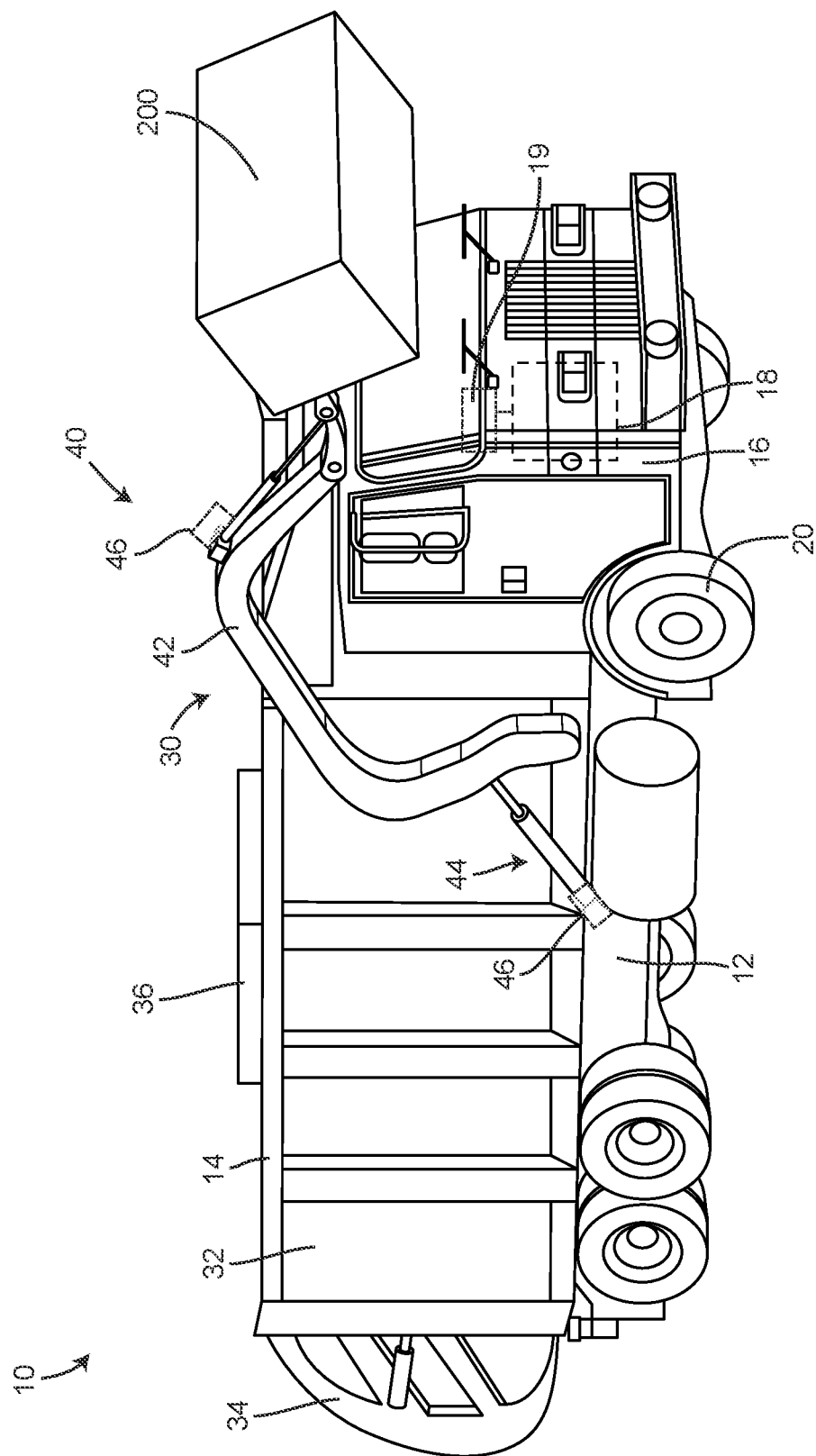
FIG. 1 is a perspective view of a refuse vehicle shown to include a controller, according to an exemplary embodiment.
Figure 2:
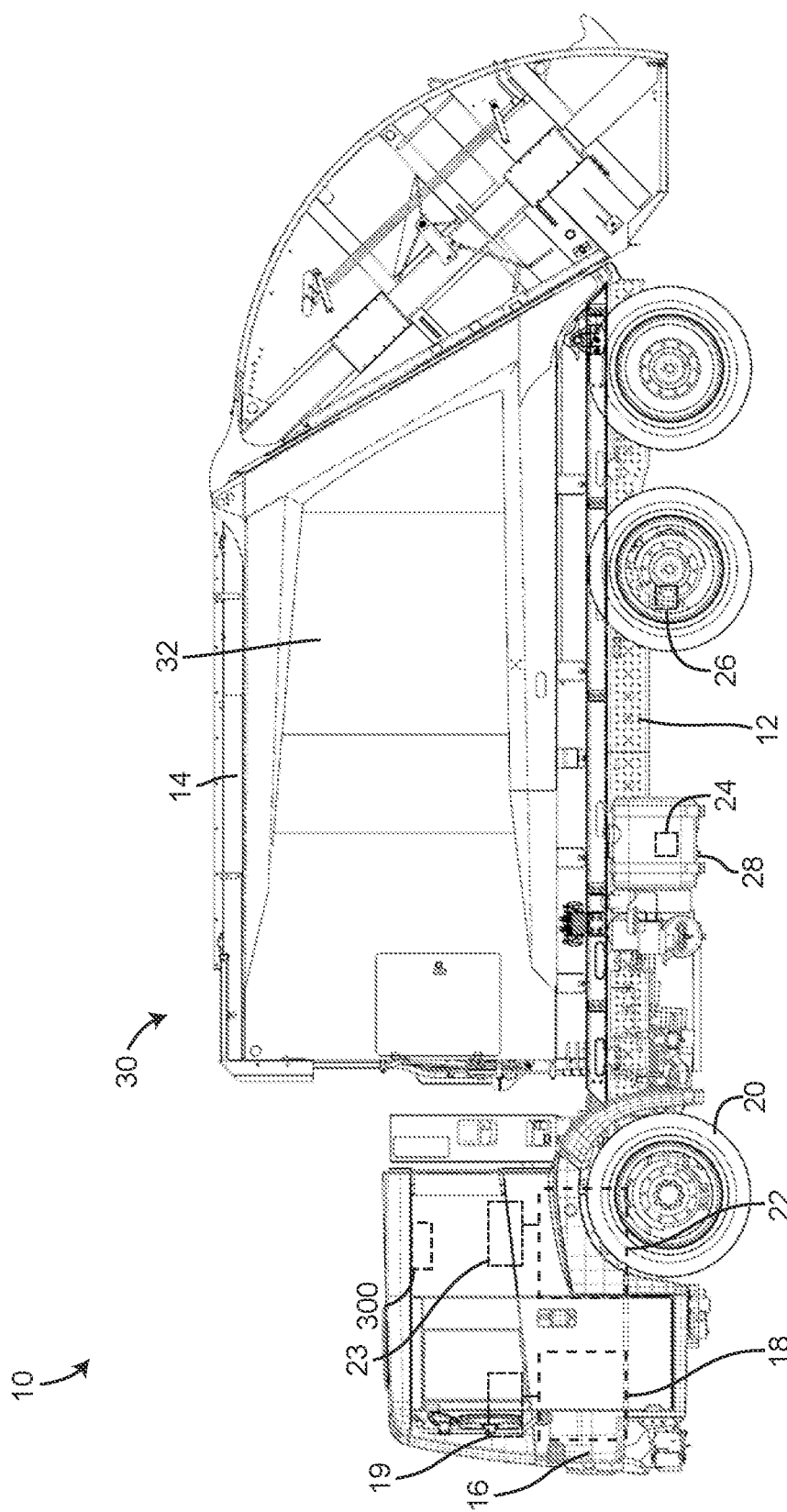
FIG. 2 is a side view of the refuse vehicle of FIG. 1.

According to the exemplary embodiment shown in FIGS. 1-2, a vehicle, shown as refuse vehicle 10 (e.g., a garbage truck, a waste collection truck, a sanitation truck, etc.), is configured as a front-loading refuse vehicle. In other embodiments, the refuse vehicle 10 is configured as a side-loading refuse vehicle, a zero radius side-loading refuse vehicle, or a rear-loading refuse vehicle. In still other embodiments, the vehicle is another type of vehicle (e.g., a skid-loader, a telehandler, a plow truck, a boom lift, etc.). As shown in FIGS. 1-2, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, hydraulic controls, a user interface, an acceleration pedal, a brake pedal, a clutch pedal, a gear selector, switches, buttons, dials, etc.). As shown in FIGS. 1-2, the refuse vehicle 10 includes a prime mover, shown as engine 18, coupled to the frame 12 at a position beneath the cab 16. The engine 18 is configured to provide power to tractive elements, shown as wheels 20, and/or to other systems of the refuse vehicle 10 (e.g., a pneumatic system, a hydraulic system, etc.). The engine 18 may be configured to utilize one or more of a variety of fuels (e.g., gasoline, diesel, bio-diesel, ethanol, natural gas, etc.), according to various exemplary embodiments. According to an alternative embodiment, the engine 18 additionally or alternatively includes one or more electric motors coupled to the frame 12 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to the systems of the refuse vehicle 10.

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted. The refuse compartment 30 may provide temporary storage for refuse during transport to a waste disposal site and/or a recycling facility. In some embodiments, at least a portion of the body 14 and the refuse compartment 30 extend in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30). In other embodiments, the storage volume is positioned between the hopper volume and the cab 16 (e.g., a rear-loading refuse vehicle, etc.).

As shown in FIG. 1, the refuse vehicle 10 includes a first lift mechanism/system (e.g., a front-loading lift assembly, etc.), shown as lift assembly 40. The lift assembly 40 includes a pair of arms, shown as lift arms 42, coupled to the frame 12 and/or the body 14 on either side of the refuse vehicle 10 such that the lift arms 42 extend forward of the cab 16 (e.g., a front-loading refuse vehicle, etc.). In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). The lift arms 42 may be rotatably coupled to frame 12 with a pivot (e.g., a lug, a shaft, etc.). As shown in FIG. 1, the lift assembly 40 includes first actuators, shown as lift arm actuators 44 (e.g., hydraulic cylinders, etc.), coupled to the frame 12 and the lift arms 42. The lift arm actuators 44 are positioned such that extension and retraction thereof rotates the lift arms 42 about an axis extending through the pivot, according to an exemplary embodiment. Lift arms 42 may be removably coupled to a container, shown as refuse container 200 in FIG. 1. In some embodiments, lift arms 42 include a pair of grabber fingers rotatably coupled to lift arms 42 and each configured to rotate about an axis extending through a pivot point of each of the grabber fingers. The grabber fingers may each rotate about the axis extending through the pivot point of each of the grabber fingers such that the grabber fingers grasp a refuse container. The lift arms 42 may then rotate about the axis extending through the pivot to empty contents of the refuse container in the refuse compartment 30.

Still referring to FIGS. 1-2, the refuse vehicle 10 is shown to include an engine control module, shown as engine control unit (ECU) 19, according to an exemplary embodiment. ECU 19 is configured to communicably connect with engine 18 and to control operations of engine 18. In some embodiments, ECU 19 communicably connects with sensors of engine 18 and controls operations of actuators of engine 18. The sensors which ECU 19 communicably connects with may be at least one of an air flow sensor, a mass airflow sensor, a pressure sensor, a temperature sensor, an engine speed sensor, an exhaust oxygen sensor, a throttle position sensor, a coolant temperature sensor, a manifold absolute pressure sensor, a crankshaft sensor, a camshaft sensor, or any other sensors relevant to the operation of engine 18. ECU 19 may receive the information from at least one of the sensors and may determine an adjustment of operation of engine 18. ECU 19 may include a processing circuit and memory configured to receive the information from the sensors through a communications interface and may use any of a lookup table, a graph, an equation, a set of rules, a set of conditions, etc., stored in the memory of ECU 19 to determine the operational adjustment of engine 18. ECU 19 may be configured to implement the operational adjustment of engine 18 by transmitting signals to controllers configured to adjust an operation of at least one of a fuel injection quantity, a timing angle, an air to fuel ratio of fuel injected, an idle speed, engine valves, etc., of engine 18.

Referring to FIG. 2, the refuse vehicle 10 is shown to include a gear system, shown as transmission 22 and a transmission control module, shown as transmission control unit (TCU) 23, according to an exemplary embodiment. Transmission 22 is configured to receive a torque output from engine 18 through a connecting shaft, adjust the torque output of engine 18, and supply the adjusted torque output of engine 18 to wheels 20. Transmission 22 may be any of a torque converter automatic transmission, a manual transmission, an automatic manual transmission, a continuously variable transmission, a dual-clutch transmission, a direct shift gearbox transmission, or any other torque converting device, and may include any number of gears, clutches, pulleys, and/or configuration of gears, clutches, and pulleys to adjust the torque output of engine 18.

TCU 23 is configured to receive information from sensors relevant to operation of transmission 22, and to control operations of transmission 22 based on the information received from the sensors. TCU 23 may receive information from sensors and systems such as a cruise control system, a brake light switch, fluid pressure sensors, a kick-down switch, a throttle position sensor, a transmission fluid temperature sensor, a turbine or input speed sensor, a vehicle speed sensor, a wheel sensor, etc. TCU 23 may receive the information from at least one of the sensors/systems and may determine an adjustment of operation of transmission 22 based on the information. TCU 23 may include a processing circuit and memory configured to receive the information from the sensors/systems through a communications interface and may use any of a lookup table, a graph, an equation, a set of rules, a set of conditions, etc., stored in the memory of TCU 23 to determine the operational adjustment of transmission 22. TCU 23 may be configured to implement the operational adjustment of transmission 22 by transmitting signals to controllers and/or other devices, such as a shift lock, shift solenoids, pressure control solenoids, a torque converter clutch solenoid, ECU 19, etc.

Referring to FIG. 1, refuse vehicle 10 is shown to include lift assembly sensors, shown as lift arm sensors 46, according to an exemplary embodiment. Lift arm sensors 46 are positioned at any position where the lift assembly 40 is configured to pivot. Lift arm sensors 46 are configured to determine an angle of a pivot point of lift assembly 40. In some embodiments, lift arm sensors 46 measure a quantity of hydraulic fluid which has entered or exited a chamber of lift arm actuators 44.

Referring to FIG. 2, refuse vehicle 10 is shown to include a fuel sensor, shown as fuel level sensor 24, and a wheel sensor, shown as wheel speed sensor 26, according to an exemplary embodiment. In some embodiments, the wheel sensor is or includes a tire pressure sensor. According to an exemplary embodiment, fuel level sensor 24 includes a variable resistor configured to change in resistance as a fuel level of a tank, shown as fuel tank 28, changes. Wheel speed sensor 26 may be a magnetic inductive sensor, or a magneto resistive sensor, according to various embodiments, and is configured to determine a speed (e.g., a rotational velocity, a linear velocity at a diameter of one of wheels 20, etc.) of one of wheels 20, according to an exemplary embodiment.

Referring still to FIG. 2, the refuse vehicle 10 is shown to include a central module, shown as controller 300, according to an exemplary embodiment. Controller 300 is configured to receive information from any of, but not limited to, control modules (e.g., ECU 19, TCU 23, etc.) and sensors (e.g., wheel speed sensor 26, fuel level sensor 24, etc.) describe with reference to FIGS. 1-2, according to an exemplary embodiment. Controller 300 may communicably connect to any electronic control module, control unit, and/or sensor of refuse vehicle 10, including but not limited to, ECU 19, TCU 23, a Powertrain Control Module (PCM), a Brake Control Module (BCM), a Central Control Module (CCM), a Central Timing Module (CTM), a General Electronic Module (GEM), a Body Control Module (BCM), a Suspension Control Module (SCM), an ABS/traction control/stability control module, an airbag (SRS) module, an anti-theft module, a cruise control module, an electronic steering module, a fuel pump control module, an injector driver module, an instrument cluster control module, a keyless entry module, a lighting module, a transfer case module, a wiper motor control module, a vehicle communications module, an HVAC module, etc., or any other electronic control units of refuse vehicle 10. Additionally, any of the electronic modules listed above may receive inputs from a variety of sensors disposed about refuse vehicle 10. Controller 300 may be communicably connected to any of the above listed modules, such that controller 300 monitors any information sent or received by any of the above listed modules. In some embodiments, controller 300 may be configured to only monitor/receive information sent/received by any of the modules listed above, while in other embodiments, controller 300 is also configured to adjust an operation of any of the modules listed above.

Controller 300 may be configured to receive information regarding a chassis of the refuse vehicle 10 (e.g., ECU 19, TCU 23, etc.), a body of the refuse vehicle 10 (e.g., pneumatics, hydraulics, sensors, cameras, electronics, Human-Machine-Interface (HMI), GPS, etc.), and a $3^{rd}$ party system present on refuse vehicle 10 (e.g., an object detection system, a driver behavior system, an Advanced Driver Assistance System (ADAS), a safety system, a weight system, etc.), according to an exemplary embodiment. According to an exemplary embodiment, controller 300 receives information from the chassis of the vehicle and the body of the vehicle through an infrastructure already present on the refuse vehicle 10. For example, controller 300 may be configured to communicably connect with ECU 19, such that controller 300 may receive information regarding engine 18, without an additional system/sensors needing to be added. Advantageously, this allows controller 300 to collect/monitor information from the refuse vehicle 10 without needing an additional system of sensors to be installed.

Controller 300 may also receive information from a third party system present on refuse vehicle 10. For example, a third party Global Positioning System (GPS) device may be disposed on refuse vehicle 10 and may communicably connect with controller 300. Other third party systems may include, but are not limited to an object detection system, a driver behavior system, an Advanced Driver Assistance System (ADAS), a safety system, a weight system, etc. Controller 300 may receive and monitor information from any of these third party systems, according to an exemplary embodiment.

Controller 300 may communicably connect to any of the chassis, body, and third party systems as described above with reference to FIGS. 1-2. In some embodiments, controller 300 may communicably connect with an on-board diagnostics (OBD) system of refuse vehicle 10. For example, controller 300 may communicably connect to an OBD II system of refuse vehicle 10 and may monitor/access any information present on the OBD II system of refuse vehicle 10.

In some embodiments, controller 300 may communicably connect to a vehicle bus of refuse vehicle 10. The vehicle bus of refuse vehicle 10 may be a Controller Area Network (CAN) bus, a Local Interconnect Network (LIN) bus, a Media Oriented Systems Transport (MOST) bus, an SAE J1850 bus, an Inter-Integrated Circuit (I²C) bus, etc., or any other bus commonly used in the automotive industry. Controller 300 may be configured to communicably connect with the vehicle bus to monitor and receive any of the information transmitted through the vehicle bus.

Figure 3:
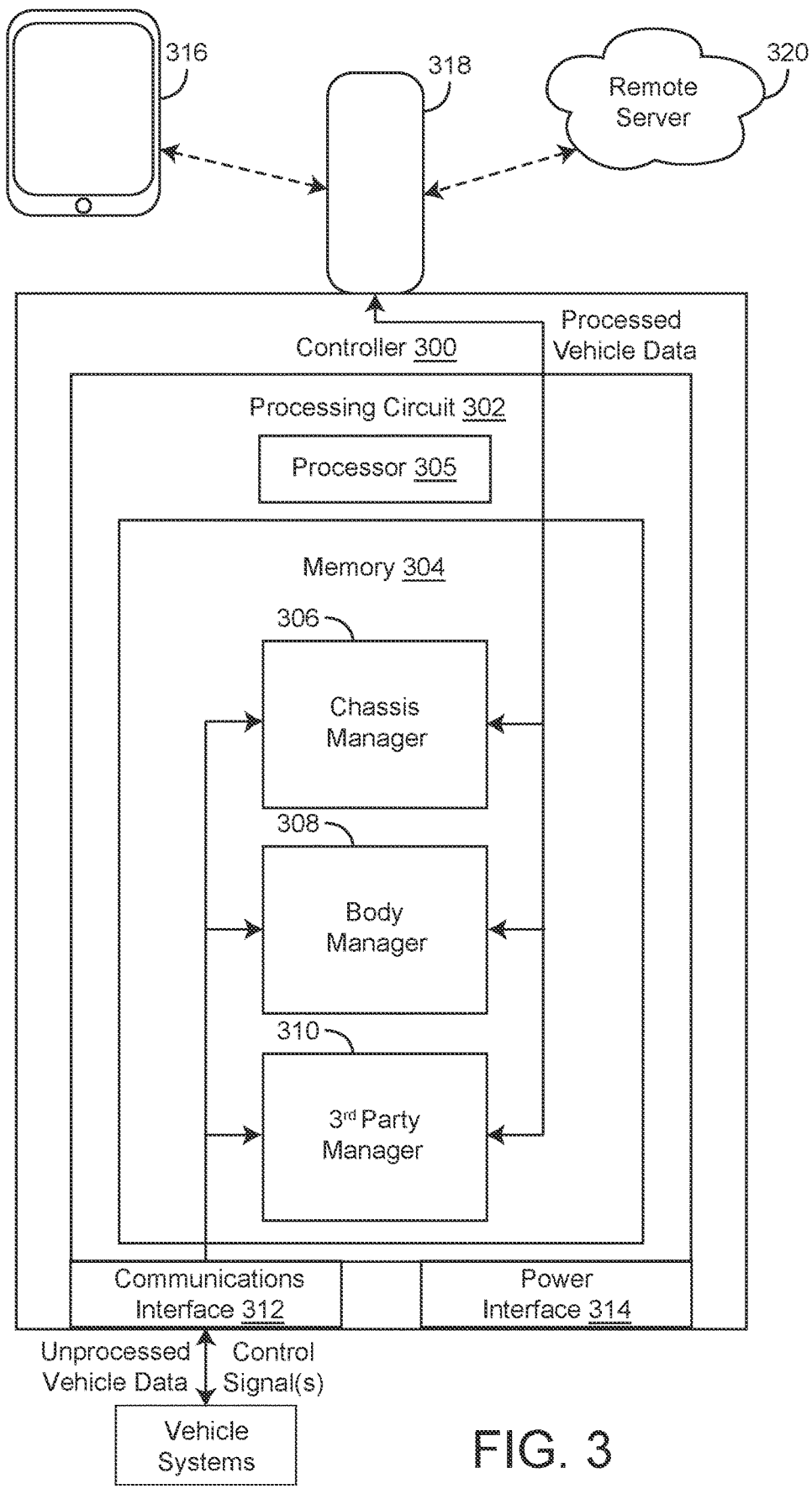
FIG. 3 is a block diagram of the controller of the refuse vehicle of FIG. 1, shown to include a chassis manager, a body manager, and a third party manager, and shown to be configured to transmit information to a remote server, according to an exemplary embodiment.

Referring now to FIG. 3, a detailed block diagram of controller 300 is shown, according to an exemplary embodiment. Controller 300 is shown to include a circuit, shown as processing circuit 302, a processor, shown as processor 305, and memory, shown as memory 304, according to an exemplary embodiment. Controller 300 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 3, controller 300 includes processing circuit 302 and a memory 304. Processing circuit 302 may include an ASIC, one or more FPGAs, a DSP, circuits containing one or more processing components, circuitry for supporting a microprocessor, a group of processing components, or other suitable electronic processing components (e.g., processor 305). In some embodiments, processing circuit 302 is configured to execute computer code stored in memory 304 to facilitate the activities described herein. Memory 304 may be any volatile or non-volatile computer-readable storage medium capable of storing data or computer code relating to the activities described herein. According to an exemplary embodiment, memory 304 includes computer code modules (e.g., executable code, object code, source code, script code, machine code, etc.) configured for execution by processing circuit 302. Memory 304 includes various actuation profiles corresponding to modes of operation (e.g., for transmission 22, for drive system 100, for a vehicle, etc.), according to an exemplary embodiment. In some embodiments, controller 300 may represent a collection of processing devices (e.g., servers, data centers, etc.). In such cases, processing circuit 302 represents the collective processors of the devices, and memory 304 represents the collective storage devices of the devices.

Controller 300 is shown receiving vehicle data through a communications port, shown as communications interface 312, according to the exemplary embodiment shown in FIG. 3. The vehicle data received through communications interface 312 may be any of the information received by controller 300, described above with reference to FIGS. 2-3 (e.g., information from the vehicle bus, ECU 19, TCU 23, fuel level sensor 24, wheel speed sensor 26, third party systems, etc.), according to some embodiments. Communications interface 312 may include wired or wireless interfaces (e.g., antennas, transmitters, transceivers, wire terminals, etc.) for conducting data communications with any of the modules, systems, and sensors as described above with reference to FIGS. 1-2.

Referring still to FIG. 3, controller 300 is shown to include a power interface, shown as power interface 314, according to an exemplary embodiment. Power interface 314 may be configured to receive electrical power (e.g., AC or DC electrical power) from a power supply (e.g., a battery) to power controller 300, according to some embodiments. In some embodiments, power interface 314 may be a power circuit including one or more circuits configured to power controller 300. The power circuit may contain transformers, filters, rectifiers, voltage regulators, resistors, transistors, capacitors, etc., configured to power controller 300 from the power source. The power source may be any type of battery, combination of batteries, capacitors, and/or another energy storage device. In some embodiments, the power source is a Lithium-Ion battery, or a Nickel-Cadmium battery. In some embodiments, the power source is a battery disposed on refuse vehicle 10 and configured to charge from refuse vehicle 10.

Referring still to FIG. 3, controller 300 is shown to include modules, shown as chassis manager 306, body manager 308, and third party manager 310, according to an exemplary embodiment. Each of chassis manager 306, body manager 308, and third party manager 310 may be configured to perform data processing on the vehicle data received through communications interface 312, according to some embodiments. Vehicle data received through communications interface 312 may be validated, sorted, summarized, aggregated, reported, filtered, classified, grouped, etc., according to some embodiments. For example, in an exemplary embodiment, each of chassis manager 306, body manager 308, and third party manager 310 are configured to receive the vehicle data, sort the vehicle data into one of three categories (e.g., a chassis data category, a body data category, and a third party data category), and convert the vehicle data into time-series data. For example, chassis manager 306 may receive the vehicle data, filter out non-chassis related data, and convert remaining filtered chassis data into time-series data, according to an exemplary embodiment. Likewise, body manager 308 and third party manager 310 may be configured to receive the vehicle data, filter out non-body or non-third party data, respectively, and convert the filtered body or third party data into time-series data, according to an exemplary embodiment. Each of chassis manager 306, body manager 308, and third party manager 310 may use any of an equation, a set of equations, a set of rules, a lookup table, a graph, a set of conditions, a decision tree, an algorithm, etc., to validate, sort, summarize, aggregate, report, filter, classify, group, etc., the vehicle data received through communications interface 312. The equation, set of equations, set of rules, lookup table, graph, set of conditions, decision tree, algorithm, etc., may be stored in memory 304 and accessed by any of chassis manager 306, body manager 308, and third party manager 310, according to some embodiments.

Referring still to FIG. 3, controller 300 is shown to include a wireless radio, shown as wireless radio 318, according to an exemplary embodiment. Wireless radio 318 may be any kind of wireless transmitter and/or receiver (e.g., a cellular dongle), configured to wirelessly communicably connect controller 300 with at least one of a remote server 320, a personal computer device 316, and a network, according to some embodiments. In some embodiments, wireless radio 318 is a cellular dongle and is configured to provide controller 300 with Internet access by connecting controller 300 to a cellular tower via a 2G network, a 3G network, an LTE network, etc. In some embodiments, wireless radio 318 communicates via Bluetooth, WiFi, Zigbee, etc.

Referring still to FIG. 3, controller 300 is shown to communicably connect with at least one of personal computer device 316, and remote server 320 via wireless radio 318, according to an exemplary embodiment. Personal computer device 316 may be any of a smartphone, a laptop computer, or any other personal computer device with Internet access, or a Bluetooth, WiFi, or Zigbee transceiver. Controller 300 may transmit processed vehicle data (e.g., time series data) to any of personal computer device 316 and remote server 320, according to an exemplary embodiment. In some embodiments, controller 300 transmits an element of time series data to any of personal computer device 316 and remote server 320. For example, controller 300 may transmit a data value (e.g., fuel level) and a time of day and date which corresponds to the data value. In some embodiments, controller 300 may transmit unprocessed vehicle data, or both processed and unprocessed vehicle data to at least one of personal computer device 316 and remote server 320.

Referring still to FIG. 3, controller is shown to receive information from at least one of personal computer device 316 and remote server 320 through wireless radio 318, according to some embodiments. In some embodiments, the information received by controller 300 through wireless radio 318 from at least one of personal computer device 316 and remote server 320 is at least one of a request and a command. For example, personal computer device 316 or remote server 320 may send a request for particular data from controller 300 (e.g., the vehicle speed at a present moment in time). Controller 300 may receive the request, and return the requested data to personal computer device 316 and/or remote server 320. In some embodiments, personal computer device 316 and remote server 320 may send a command to controller 300 through wireless radio 318. The command may be a command to adjust an operation of a controllable/reprogrammable device (e.g., ECU 19) of at least one of the chassis, the body, and the third party systems. In some embodiments, controller 300 may be configured to convert the command into a control signal and supply the control signal to the controllable/reprogrammable device. In some embodiments, chassis manager 306, body manager 308, and third party manager 310 may be configured to receive the command and determine the control signal for a device relating to the chassis, body, and third party systems, respectively.

Controller 300 may transmit at least one of processed vehicle data and unprocessed vehicle data to at least one of personal computer device 316 and remote server 320 upon request (as described in greater detail above), or over time intervals, according to some embodiments. For example, the time interval may be any time value (e.g., five seconds, a minute, ten minutes, an hour, etc.), and controller 300 may transmit at least one of processed vehicle data and unprocessed vehicle data after every time interval (e.g., every five seconds, every minutes, every ten minutes, every hour, etc.). According to an exemplary embodiment, controller 300 transmits time-series data (e.g., processed vehicle data) to remote sever 320 where the time-series data is stored. For example, controller 300 may transmit data points regarding a speed of the refuse vehicle 10 every 5 seconds to remote server 320, as well as a corresponding data and time of day for each data point (e.g., at 15:02:05 PM on 2018-05-03: 35 mph, at 15:02:10 PM on 2018-05-03: 40 mph, etc.). In some embodiments controller 300 also transmits a unique identification number/value of the refuse vehicle 10 with every data transmission to the personal computer device 316 and/or remote server 320. Advantageously, this may allow the transmitted data to be sorted by refuse vehicle if remote server 320 and/or personal computer device 316 receive data transmissions from multiple refuse vehicles (e.g., a fleet of refuse vehicles).

In some embodiments, controller 300 is configured to use a mapping between either the processed vehicle data and the unprocessed vehicle data and the various sensors, devices, actuators, systems, etc., of the refuse vehicle 10 from which the unprocessed vehicle data is collected. The mapping may include a rule, a set of rules, identifiers, etc., that map the unprocessed or processed vehicle data to the sensors, devices, actuators, systems, etc., from which the unprocessed vehicle data was obtained. For example, processed vehicle data that relates to a fuel level or a position of the refuse vehicle 10 as obtained by a particular fuel sensor or a particular global positioning system (GPS) may be assigned a particular identifier, serial number, etc., or may include the particular identifier or serial number that is read from the particular fuel sensor or GPS. In some embodiments, processed or unprocessed vehicle data includes a tag, a label, or an identifier that indicates a type of data. For example, speed data obtained from a wheel speed sensor of the refuse vehicle 10 may be assigned a "velocity" tag by controller 300 (or by remote server 320) so that remote server 320 may provide "velocity" data in response to a user request for speed data of the refuse vehicle 10. In some embodiments, each sensor, system, device, etc., of refuse vehicle 10 includes a corresponding tag, identifier, label, identification number, serial number, device identifier, sensor identifier, etc., and processed or unprocessed data obtained from each sensor, system, device, etc., includes a tag, label, or identifier. The mapping may be a mapping between the various tags, labels, identifiers, etc., of the processed or unprocessed data and the tag, identifier, label, identification number, serial number, device identifier, sensor identifier, etc., of the various systems, actuators, sensors, devices, etc., of the refuse vehicle. In this way, remote server 320 and/or controller 300 may use the mapping to match the processed or unprocessed vehicle data to a specific sensor, system, device, actuator, etc., of the refuse vehicle 10 or to a particular sensor of a particular refuse vehicle 10.

Figure 4:
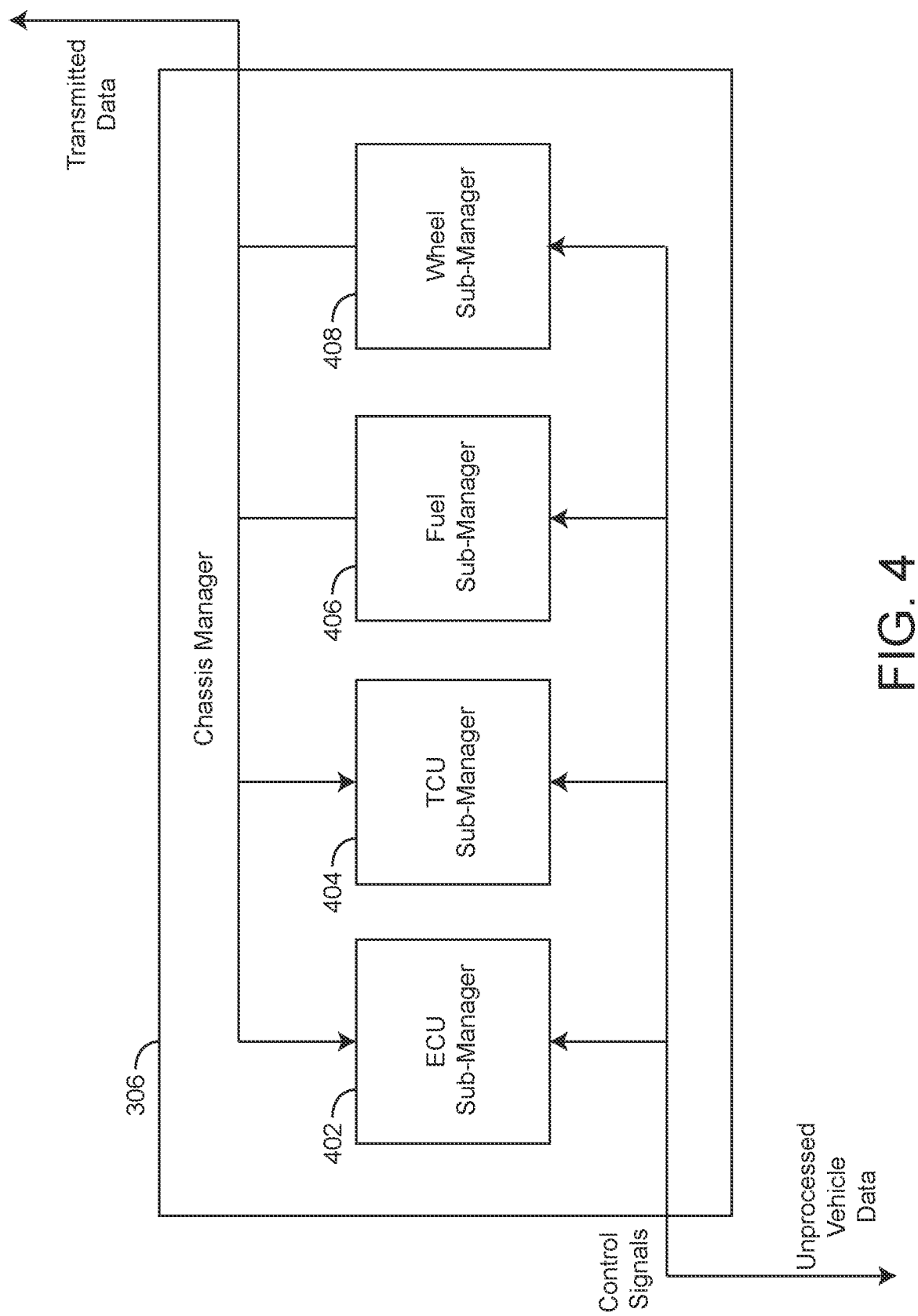
FIG. 4 is a block diagram of the chassis manager of the controller of FIG. 3, shown in greater detail, according to an exemplary embodiment.

Referring now to FIG. 4, the chassis manager 306 of the controller 300 of FIG. 3 is shown in greater detail, according to an exemplary embodiment. Chassis manager 306 is shown to include multiple sub-modules, shown as ECU sub-manager 402, TCU sub-manager 404, fuel sub-manager 406, and wheel sub-manager 408. Each of ECU sub-manager 402, TCU sub-manager 404, fuel sub-manager 406, and wheel sub-manager 408 may be configured to validate, sort, summarize, aggregate, report, filter, classify, group, etc., any of the unprocessed vehicle data relevant to the ECU 19, TCU 23, fuel level sensor 24, and wheel speed sensor 26, respectively. For example, each of ECU sub-manager 402, TCU sub-manager 404, fuel sub-manager 406, and wheel sub-manager 408 may be configured to convert the unprocessed vehicle data relevant to the ECU 19, TCU 23, fuel level sensor 24, and wheel speed sensor 26, respectively, into time-series data.

Each of ECU sub-manager 402, TCU sub-manager 404, fuel sub-manager 406, and wheel sub-manager 408 may use any of an equation, a set of equations, a set of rules, a lookup table, a graph, a set of conditions, a decision tree, an algorithm, etc., to validate, sort, summarize, aggregate, report, filter, classify, group, etc., the unprocessed data relevant to the ECU 19, TCU 23, fuel level sensor 24, and wheel speed sensor 26, respectively. For example, if fuel level sensor 24 outputs a voltage value, and the voltage value correlates to a fuel level (e.g., gallons remaining in fuel tank 28, height of fluid in fuel tank 28, percent of fuel remaining in fuel tank 28), fuel sub-manager 406 may use any of an equation, a set of equations, a set of rules, a lookup table, a graph, a set of conditions, a decision tree, an algorithm, etc., to determine the fuel level based on the voltage value. An associated time, date, and unique vehicle identification number/value may also be assigned to the fuel level determined based on the voltage value. Likewise, ECU sub-manager 402 may determine, for example, a time series value of an RPM of the engine 18, and similarly apply an associated time, date, and unique vehicle identification number/value to the time series RPM engine value.

Likewise, TCU sub-manager 404 and wheel sub-manager 408 may be configured to determine a time series value with an associated time, date, and unique vehicle identification number/value of any data relevant to the TCU 23 and wheels 20 of the refuse vehicle 10, according to some embodiments. The data relevant to the TCU 23 may be any of a transmission RPM data, an output torque, an engaged gear, a transmission fluid temperature, etc., and the data relevant to the wheels 20 may be any of a wheel speed, a tire pressure, etc.

Chassis manager 306 may include any number of modules or sub-managers, each configured to validate, sort, summarize, aggregate, report, filter, classify, group, etc., unprocessed vehicle data relevant to a particular sensor, control unit, vehicle module, etc., and, in some embodiments, each of the sub-managers may output a time series value with a corresponding time, date, and unique vehicle identification number/value.

Likewise, some of the sub-managers of chassis manager 306 may be configured to generate control signals for a controllable/reprogrammable control unit (e.g., ECU 19 and TCU 23). For example, ECU sub-manager 402 may receive a command indicating an adjusted max RPM of engine 18. ECU sub-manager 402 may be configured to determine a control signal which achieves the adjusted max RPM of engine 18, and may output the control signal to ECU 19 to adjust the max RPM of engine 18.

Figure 5:
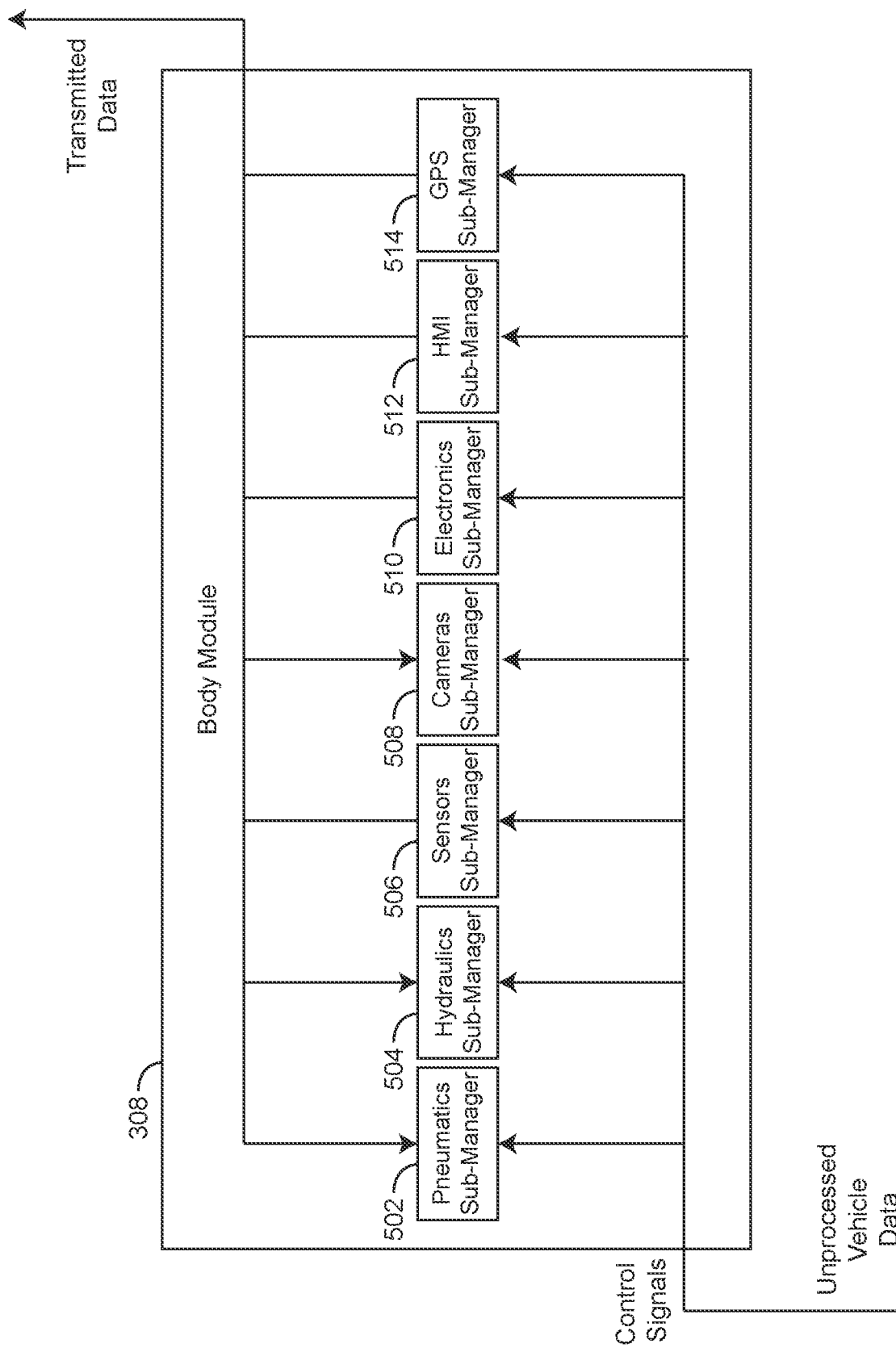
FIG. 5 is a block diagram of the body manager of the controller of FIG. 3, shown in greater detail, according to an exemplary embodiment.

Referring now to FIG. 5, body manager 308 is shown in greater detail, according to an exemplary embodiment. In some embodiments, body manager 308 includes a pneumatics sub-manager 502, a hydraulics sub-manager 504, a sensors sub-manager 506, a cameras sub-manager 508, an electronics sub-manager 510, a Human-Machine-Interface (HMI) sub-manager 512, and a Global Positioning System (GPS) sub-manager 514. Each of pneumatics sub-manager 502, hydraulics sub-manager 504, sensors sub-manager 506, cameras sub-manager 508, electronics sub-manager 510, HMI sub-manager 512, and GPS sub-manager 514 may be configured to operate similarly to sub-managers 402-408 of chassis manager 306, as described in further detail above with reference to FIG. 4 to output a time-series data value with a corresponding date, time, and unique vehicle identification number/value. For example, pneumatics sub-manager 502 may receive a voltage value corresponding to an operation of a pneumatic device on the body of refuse vehicle 10 (e.g., a pneumatic cylinder). Pneumatics sub-manager 502 may use any of an equation, a set of equations, a set of rules, a lookup table, a graph, a set of conditions, a decision tree, an algorithm, etc., to validate, sort, summarize, aggregate, report, filter, classify, group, etc., or determine a time series value with a corresponding date, time, and unique vehicle identification number/value relevant to the pneumatic device (e.g., a degree of extension of a pneumatic cylinder on a specific date, at a specific time, for a specific refuse vehicle).

Hydraulics sub-manager 504 may be configured to validate, sort, summarize, aggregate, report, filter, classify, group, etc., or determine a time series value with a corresponding date, time, and unique vehicle identification number/value relevant to a hydraulic device (e.g., a degree of extension of extension of a hydraulic cylinder, an angle defined by one or more arms of a lift assembly, etc.), by using an equation, a set of equations, a set of rules, a lookup table, a graph, a set of conditions, a decision tree, an algorithm, etc. Sensors sub-manager 506 may be configured to validate, sort, summarize, aggregate, report, filter, classify, group, etc., or determine a time series value with a corresponding date, time, and unique vehicle identification number/value relevant to a sensor (e.g., a light sensor, a weight sensor, a temperature sensor, etc.) on the body of the refuse vehicle 10, by using an equation, a set of equations, a set of rules, a lookup table, a graph, a set of conditions, a decision tree, an algorithm, etc. Cameras sub-manager 508 may be configured to validate, sort, summarize, aggregate, report, filter, classify, group, etc., or determine a time series value with a corresponding date, time, and unique vehicle identification number/value relevant to a camera or cameras (e.g., a security camera) on the body of the refuse vehicle 10, by using an equation, a set of equations, a set of rules, a lookup table, a graph, a set of conditions, a decision tree, an algorithm, etc.

Electronics sub-manager 510 may be configured to validate, sort, summarize, aggregate, report, filter, classify, group, etc., or determine a time series value with a corresponding date, time, and unique vehicle identification number/value relevant to an electronic sub-manager (e.g., a lift arm engagement switch) on the body of the refuse vehicle 10, by using an equation, a set of equations, a set of rules, a lookup table, a graph, a set of conditions, a decision tree, an algorithm, etc. HMI sub-manager 512 may be configured to validate, sort, summarize, aggregate, report, filter, classify, group, etc., or determine a time series value with a corresponding date, time, and unique vehicle identification number/value relevant to an HMI (e.g., a user interface, an accelerator pedal sensor, a brake pedal sensor, a degree of a turn of a steering wheel, etc.) on the body of the refuse vehicle 10, by using an equation, a set of equations, a set of rules, a lookup table, a graph, a set of conditions, a decision tree, an algorithm, etc. GPS sub-manager 514 may be configured to validate, sort, summarize, aggregate, report, filter, classify, group, etc., or determine a time series value with a corresponding date, time, and unique vehicle identification number/value relevant to a GPS device (e.g., a GPS receiver) on the body of the refuse vehicle 10, by using an equation, a set of equations, a set of rules, a lookup table, a graph, a set of conditions, a decision tree, an algorithm, etc.

In some embodiments, the validation, sorting, summarization, aggregation, reporting, filtering, classifying, grouping, etc., processes of each of pneumatics sub-manager 502, hydraulics sub-manager 504, sensors sub-manager 506, cameras sub-manager 508, electronics sub-manager 510, HMI sub-manager 512, and GPS sub-manager 514, are different due to each of pneumatics sub-manager 502, hydraulics sub-manager 504, sensors sub-manager 506, cameras sub-manager 508, electronics sub-manager 510, HMI sub-manager 512, and GPS sub-manager 514 using a different equation, set of equations, set of rules, lookup table, graph, set of conditions, decision tree, algorithm, etc., to process the unprocessed vehicle data and determine a time series value with a corresponding date, time, and unique vehicle identification number/value.

Some of pneumatics sub-manager 502, hydraulics sub-manager 504, sensors sub-manager 506, cameras sub-manager 508, electronics sub-manager 510, HMI sub-manager 512, and GPS sub-manager 514 may be configured to generate control signals similarly to ECU sub-manager 402 of FIG. 4, if the device which pneumatics sub-manager 502, hydraulics sub-manager 504, sensors sub-manager 506, cameras sub-manager 508, electronics sub-manager 510, HMI sub-manager 512, and GPS sub-manager 514 relate to are controllable/reprogrammable.

Body manager 308 may include any number of modules or sub-managers, each configured to validate, sort, summarize, aggregate, report, filter, classify, group, etc., unprocessed vehicle data relevant to a particular sensor, control unit, vehicle module, etc., and, in some embodiments, each of the sub-managers may output a time series value with a corresponding time, date, and unique vehicle identification number/value.

Figure 6:
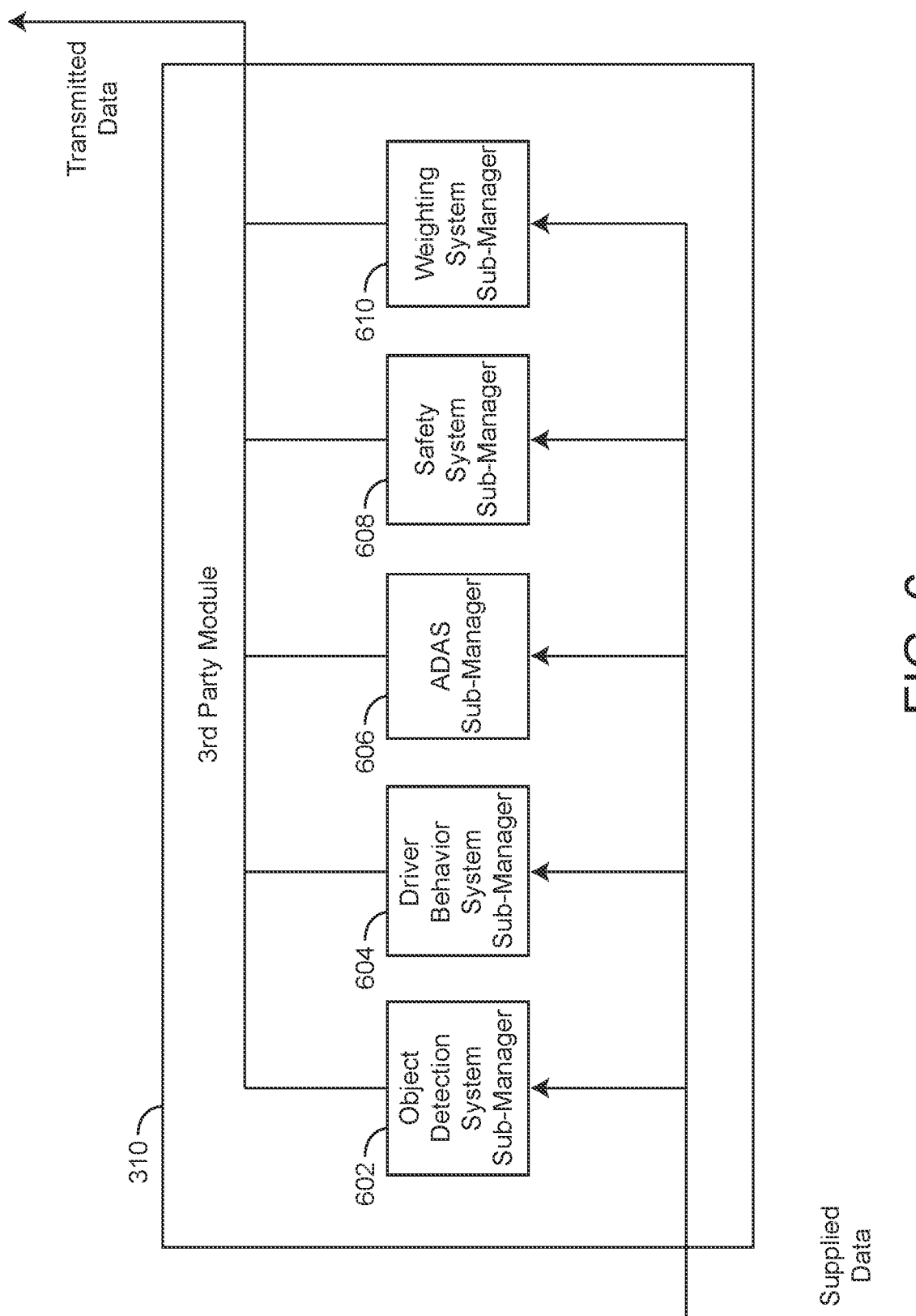
FIG. 6 is a block diagram of the third party manager of the controller of FIG. 3, shown in greater detail, according to an exemplary embodiment.

Referring now to FIG. 6, third party manager 310 is shown in greater detail, according to an exemplary embodiment. Third party manager 310 may include an object detection system sub-manager 602, a driver behavior system sub-manager 604, an advanced driver-assistance system (ADAS) sub-manager 606, a safety system sub-manager 608, and a weighting system sub-manager 610, according to some embodiments. Each of object detection system sub-manager 602, driver behavior system sub-manager 604, ADAS sub-manager 606, safety system sub-manager 608, and weighting system sub-manager 610 may be configured to operate similarly to sub-managers 402-408 of chassis manager 306, as described in further detail above with reference to FIG. 4 and similarly to sub-managers 502-514 of body manager 308 as described in further detail above with reference to FIG. 5 to output a time-series data value with a corresponding date, time, and unique vehicle identification number/value. Object detection system sub-manager 602 may be configured to validate, sort, summarize, aggregate, report, filter, classify, group, etc., or determine a time series value with a corresponding date, time, and unique vehicle identification number/value relevant to an object detection system (e.g., a camera-based object detection system that may use edge detection, contrast detection, machine learning algorithms, etc., to detect objects) disposed on the refuse vehicle 10, by using an equation, a set of equations, a set of rules, a lookup table, a graph, a set of conditions, a decision tree, an algorithm, etc. Driver behavior system sub-manager 604 may be configured to validate, sort, summarize, aggregate, report, filter, classify, group, etc., or determine a time series value with a corresponding date, time, and unique vehicle identification number/value relevant to a driver behavior system (e.g., a system to monitor and classify driving habits) disposed on the refuse vehicle 10, by using an equation, a set of equations, a set of rules, a lookup table, a graph, a set of conditions, a decision tree, an algorithm, etc. ADAS sub-manager 606 may be configured to validate, sort, summarize, aggregate, report, filter, classify, group, etc., or determine a time series value with a corresponding date, time, and unique vehicle identification number/value relevant to an advanced driver-assistance system (e.g., a system which monitors and determines safety risks and either notifies a vehicle operator or implements a change to the vehicle operation to enhance safety) disposed on the refuse vehicle 10, by using an equation, a set of equations, a set of rules, a lookup table, a graph, a set of conditions, a decision tree, an algorithm, etc. Safety system sub-manager 608 may be configured to validate, sort, summarize, aggregate, report, filter, classify, group, etc., or determine a time series value with a corresponding date, time, and unique vehicle identification number/value relevant to a vehicle safety system (e.g., a driver alertness detection system configured to monitor at least one of driving patterns, steering patterns, a driver's eyes, etc., to prevent the driver from falling asleep while operating refuse vehicle 10) disposed on the refuse vehicle 10, by using an equation, a set of equations, a set of rules, a lookup table, a graph, a set of conditions, a decision tree, an algorithm, etc. Weighting system sub-manager 610 may be configured to validate, sort, summarize, aggregate, report, filter, classify, group, etc., or determine a time series value with a corresponding date, time, and unique vehicle identification number/value relevant to a weighting system module (e.g., a system that monitors the weight of the refuse vehicle and may use strain gauges) disposed on the refuse vehicle 10, by using an equation, a set of equations, a set of rules, a lookup table, a graph, a set of conditions, a decision tree, an algorithm, etc.

In some embodiments, the validation, sorting, summarization, aggregation, reporting, filtering, classifying, grouping, etc., processes of each of object detection system sub-manager 602, driver behavior system sub-manager 604, ADAS sub-manager 606, safety system sub-manager 608, and weighting system sub-manager 610 are different due to each of object detection system sub-manager 602, driver behavior system sub-manager 604, ADAS sub-manager 606, safety system sub-manager 608, and weighting system sub-manager 610 using a different equation, set of equations, set of rules, lookup table, graph, set of conditions, decision tree, algorithm, etc.

Some of object detection system sub-manager 602, driver behavior system sub-manager 604, ADAS sub-manager 606, safety system sub-manager 608, and weighting system sub-manager 610 may be configured to generate control signals similarly to ECU sub-manager 402 of FIG. 4, if the system which object detection system sub-manager 602, driver behavior system sub-manager 604, ADAS sub-manager 606, safety system sub-manager 608, and weighting system sub-manager 610 relate to are controllable/reprogrammable.

Third party manager 310 may include any number of modules or sub-managers, each configured to validate, sort, summarize, aggregate, report, filter, classify, group, etc., unprocessed vehicle data relevant to a particular third party system and, in some embodiments, each of the sub-managers may output a time series value with a corresponding time, date, and unique vehicle identification number/value.

Referring now to FIG. 7, a time-series dataset 700 which may be transmitted by controller 300 is shown, according to an illustrative embodiment. The time-series dataset 700 is shown to include a vehicle identification number. This may advantageously allow the time-series dataset 700 to be categorized such that it can be differentiated from time-series data of other refuse vehicles. The set of time-series data shown in FIG. 7 includes speed, latitude, longitude, and fuel level, according to an illustrative embodiment. In some embodiments, the time-series dataset 700 includes any other data which controller 300 may be configured to receive from refuse vehicle 10 and transmit. In some embodiments, the time-series dataset 700 includes only speed, latitude, longitude, and fuel level due to the time-series dataset 700 being sent in response to a request to receive only speed, latitude, longitude, and fuel level from a specific refuse vehicle.

Referring still to FIG. 7, the time-series dataset 700 is shown to have a time step of ten seconds, according to some embodiments. Each of the speed, latitude, longitude, and fuel level data points correspond to the ten-second time step (e.g., speed, latitude, longitude and fuel level at 06:05:10; speed, latitude, longitude, and fuel level at 06:05:20, etc.). In some embodiments, the time-step is determined by the request sent to the controller (e.g., a request for speed, latitude, longitude, and fuel level data every ten seconds). In some embodiments, the time-step is determined by a default value of the controller 300 and the time-series dataset 700 may include all of the data received/collected/monitored by controller 300 from the refuse vehicle 10. In some embodiments, the time-step is determined by a refresh rate of the controller 300. Time-series dataset 700 may include all, or some of the data received/collected/monitored by controller 300 from the refuse vehicle 10.

Referring still to FIG. 7, the time-series dataset 700 is shown to include speed time-series data. The speed time-series data may be determined by controller 300 from information from a wheel speed sensor, a speedometer, and/or a TCU of refuse vehicle 10, according to some embodiments. From the speed time series data, it can be seen that the refuse vehicle 10 undergoes a relatively constant speed of 35 mph until approximately 06:07:10 when the speed of the refuse vehicle 10 decreases until it reaches a speed of 0 mph at 06:07:30. From the speed time-series data and the time of the speed time-series data, an average acceleration can be determined. In some embodiments, the average acceleration is determined by a device which receives the time-series dataset 700 (e.g., personal computer device 316 or remote server 320). The average acceleration may be used to monitor braking and acceleration habits of an operator of the refuse vehicle 10, or to determine collision events, sudden braking events, etc. Additionally, the speed of the refuse vehicle 10 may be validated using the latitude/longitude and time of the time-series dataset 700. For example, the latitude and longitude data may be used to determine a change in distance over one time step, and the value of the time step may be used with the change in distance to determine average velocity over the time step.

The latitude and longitude time-series data may be used to monitor a route of the refuse vehicle 10, and to determine an amount of time it takes refuse vehicle 10 to complete the route. The latitude and longitude time-series data may also be used to determine if the refuse vehicle 10 is driven to a location outside of the route, according to some embodiments. In some embodiments, the latitude and longitude time-series data may be used to determine a direction of travel of refuse vehicle 10 and may be used to determine turns made by refuse vehicle 10. Time-series dataset 700 is also shown to include fuel time-series data, according to the illustrative embodiment. The fuel time-series data may be used to monitor a fuel level of refuse vehicle 10, to determine an amount of fuel required for refuse vehicle 10 to perform a particular route, to determine segments of the route which consume the most fuel, etc. The fuel time-series data may also be used to determine driving habits of the operation of refuse vehicle 10. For example, the fuel time-series data may be used to determine inefficient driving habits (e.g., hash accelerations), and may also be used to determine fuel efficiency of the refuse vehicle 10. For example, the latitude and longitude time-series data may be used to determine the distance travelled over a time period, and the fuel time-series data may be used to determine an amount of fuel consumed over the time period. The distance travelled over the time period and the amount of fuel consumed over the time period may be used to calculate fuel efficiency over the time period.

Figure 8:
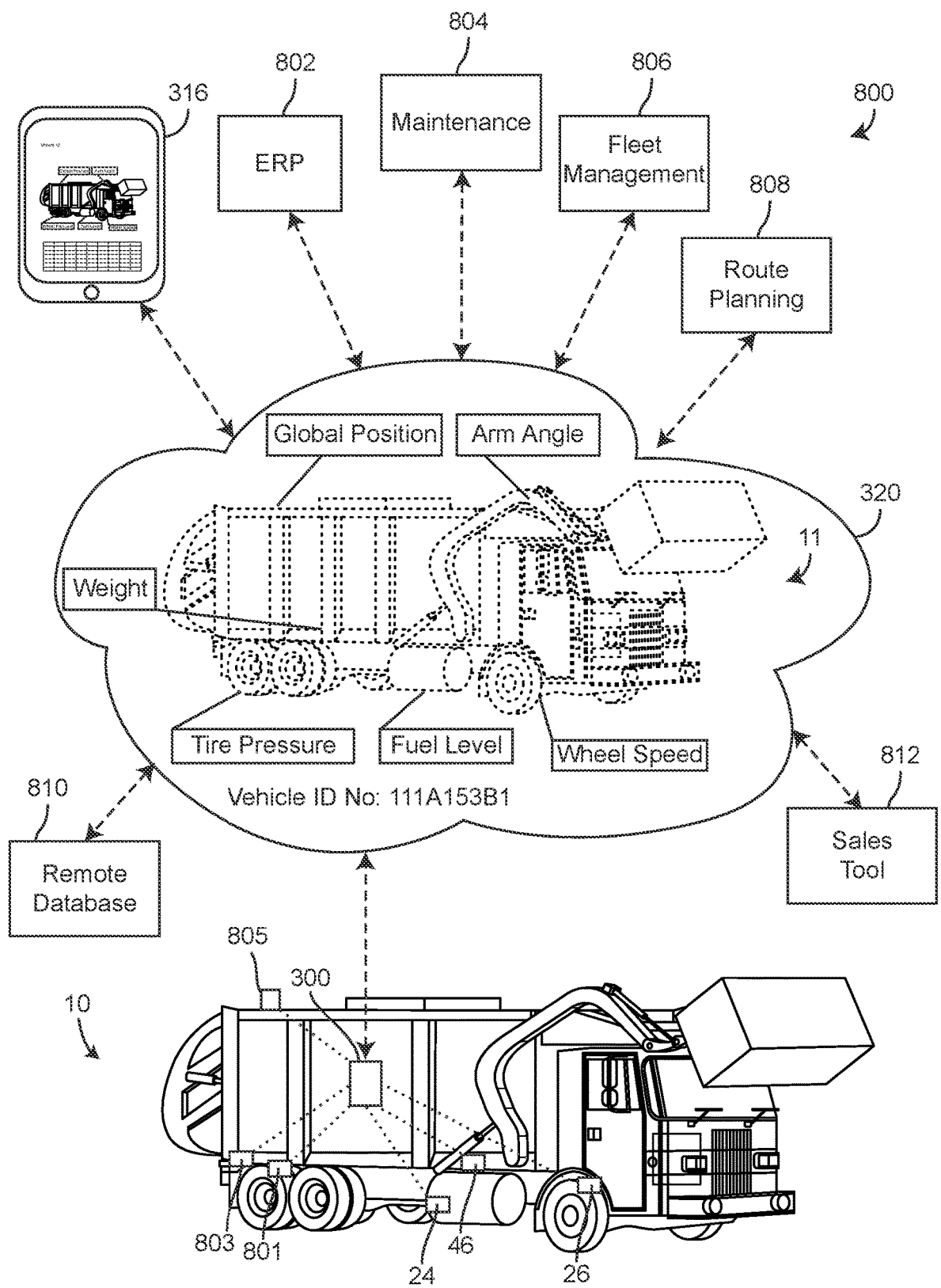
FIG. 8 is a diagram of a virtual refuse vehicle system shown to include a remote server, according to an exemplary embodiment.

Referring now to FIG. 8, a virtual refuse vehicle system 800 is shown, according to an illustrative embodiment. Virtual refuse vehicle system 800 is shown to include a vehicle, shown as refuse vehicle 10 and a server, shown as remote server 320. Remote server 320 is shown to include a digital twin, shown as virtual refuse vehicle 11, according to the illustrative embodiment. Remote server 320 is shown to receive information from controller 300 of refuse vehicle 10, and uses the received information from controller 300 to generate virtual refuse vehicle 11. For example, controller 300 is shown receiving information from a wheel sensor, shown as wheel speed sensor 26, a lift arm sensor, shown as lift arm sensor 46, a fuel level sensor, shown as fuel level sensor 24, a pressure sensor, shown as tire pressure sensor 801, a weight sensor, shown as weight sensor 803, and a GPS transceiver, shown as GPS transceiver 805, and sending the information to remote server 320 according to the illustrative embodiment. Remote server 320 is shown receiving the information from controller 300 and using the information to generate virtual refuse vehicle 11. Virtual refuse vehicle 11 may be a digital twin of refuse vehicle 10, and may include any or all of the information received from controller 300 to model and display a live-view of refuse vehicle 10.

Virtual refuse vehicle 11 is shown displaying the wheel speed, fuel level, tire pressure, weight, global position, and arm angle of virtual refuse vehicle 11, which corresponds to the wheel speed, fuel level, tire pressure, weight, global position, and arm angle of refuse vehicle 10. Virtual refuse vehicle 11 may model any of an operational status, a dynamic state, and properties of refuse vehicle 10, according to some embodiments. In some embodiments, various devices and/or applications may be configured to access and monitor virtual refuse vehicle 11 by connecting to remote server 320. Remote server 320 is shown communicably connected to any of personal computer device 316, an Enterprise Resource Planning (ERP) system 802, a maintenance system 804, a fleet management system 806, a route planning system 808, a remote database 810, and a sales tool 812. Remote server 320 may be configured to store historical information of virtual refuse vehicle 11 (e.g., to store time-series data of all or some of the information received from controller 300 corresponding to refuse vehicle 10), or to send historical information of virtual refuse vehicle 11 for storage in remote database 810. In some embodiments, remote database 810 includes memory which may be any volatile or non-volatile computer-readable storage medium capable of storing data or computer code relevant to virtual refuse vehicle 11.

Figure 9:
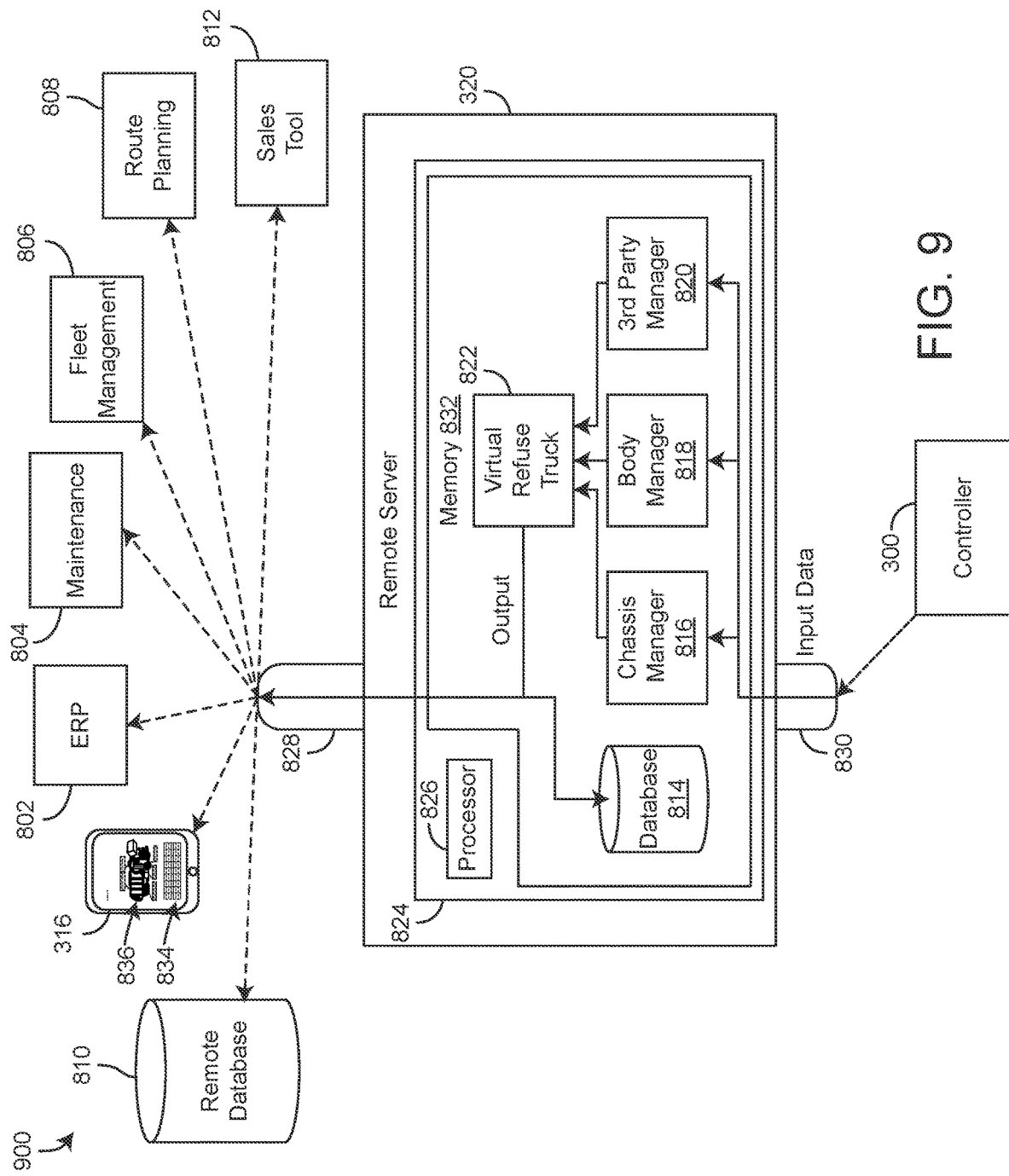
FIG. 9 is a detailed diagram of the virtual refuse vehicle system of FIG. 8, according to an exemplary embodiment.

Referring now to FIG. 9, a block diagram of virtual refuse vehicle system 900 is shown in greater detail, according to an exemplary embodiment. Remote server 320 is shown to include a circuit, shown as processing circuit 824, a processor, shown as processor 826, and memory, shown as memory 832, according to an exemplary embodiment. Remote server 320 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 9, remote server 320 includes processing circuit 824 and memory 832. Processing circuit 824 may include an ASIC, one or more FPGAs, a DSP, circuits containing one or more processing components, circuitry for supporting a microprocessor, a group of processing components, or other suitable electronic processing components (e.g., processor 826). In some embodiments, processing circuit 824 is configured to execute computer code stored in memory 832 to facilitate the activities described herein. Memory 832 may be any volatile or non-volatile computer-readable storage medium capable of storing data or computer code relating to the activities described herein. According to an exemplary embodiment, memory 832 includes computer code modules (e.g., executable code, object code, source code, script code, machine code, etc.) configured for execution by processing circuit 824 or by processor 826 communicably connected to memory 832 via processing circuit 824. In some embodiments, remote server 320 may represent a collection of processing devices (e.g., servers, data centers, etc.). In such cases, processing circuit 824 represents the collective processors of the devices, and memory 832 represents the collective storage devices of the devices.

It should be understood that any of the functionality of remote server 320 (e.g., the functionality of chassis manager 816, body manager 818, $3^{rd}$ party manager 820, database 814, or virtual refuse truck manager 822, etc.) may be performed by controller 300.

Referring still to FIG. 9, remote server 320 is shown to include a first wireless radio, shown as input wireless radio 830, and a second wireless radio, shown as output wireless radio 828, according to the exemplary embodiment shown in FIG. 9. Each of input wireless radio 830 and output wireless radio 828 may be any kind of wireless transmitter and/or receiver (e.g., a cellular dongle), configured to wirelessly communicably connect remote server 320 with at least one of controller 300, remote database 810, personal computer device 316, ERP system 802, maintenance system 804, fleet management system 806, route planning system 808, sales tool 812, and a network, according to some embodiments. In some embodiments, each of input wireless radio 830 and output wireless radio 828 is a cellular dongle and is configured to provide remote server 320 with Internet access by connecting remote server 320 to a cellular tower via a 2G network, a 3G network, an LTE network, etc. In some embodiments, each of input wireless radio 830 and output wireless radio 828 communicates via Bluetooth, WiFi, Zigbee, etc.

According to the exemplary embodiment shown in FIG. 9, input wireless radio 830 is configured to receive input data from controller 300. The input data received from controller 300 may be processed vehicle data (e.g., time series data), or unprocessed vehicle data, according to some embodiments. In some embodiments, the input data received from controller 300 may be a combination of processed vehicle data (e.g., time series data) and unprocessed vehicle data. If remote server 320 receives unprocessed vehicle data from controller 300 through input wireless radio 830, remote server 320 may be configured to process the unprocessed data, according to some embodiments. Remote server 320 is shown to include chassis manager 816, body manager 818, and third party manager 820. In some embodiments, chassis manager 816 is chassis manager 306 and is configured to process data in the same manner as described above in greater detail with reference to FIG. 4. In some embodiments, body manager 818 is body manager 308 and is configured to process data in the same manner as described above in greater detail with reference to FIG. 5. In some embodiments, third party manager 820 is third party manager 310 and is configured to process data in the same manner as described above in greater detail with reference to FIG. 6. In some embodiments, each of chassis manager 816, body manager 818, and third party manager 820 perform the same actions as chassis manager 306, body manager 308, and third party manager 310, as described above in greater detail with reference to FIGS. 4-6, and also perform additional actions/processes.

Each of chassis manager 816, body manager 818, and third party manager 820 may be configured to validate, sort, summarize, aggregate, report, filter, classify, group, etc., any of the input data (e.g., processed vehicle data and/or unprocessed vehicle data) using any of an equation, a set of equations, a set of rules, a lookup table, a graph, a set of conditions, a decision tree, an algorithm, etc. In some embodiments, the equation, set of equations, set of rules, lookup table, graph, set of conditions, decision tree, algorithm, etc., which each of chassis manager 816, body manager 818, and third party manager 820 use is different. Each of chassis manager 816, body manager 818, and third party manager 820 may be configured to supply the processed data to virtual refuse vehicle manager 822. Virtual refuse vehicle manager 822 may receive the data from each of chassis manager 816, body manager 818, and third party manager 820, and use the data to generate virtual refuse vehicle 11. Virtual refuse vehicle manager 822 may generate both a graphical representation (e.g., a CAD model, a computer generated model, a wireframe model, etc.) of virtual refuse vehicle 11, as well as applying information from the data supplied by each of chassis manager 816, body manager 818, and third party manager 820 to virtual refuse vehicle 11.

Virtual refuse vehicle manager 822 may be configured to output virtual refuse vehicle 11 (e.g., the graphical representation of virtual refuse vehicle 11 and/or the information of virtual refuse vehicle 11 received from each of chassis manager 816, body manager 818, and third party manager 820) to at least one of database 814 and output wireless radio 828. In some embodiments, virtual refuse vehicle manager 822 outputs/writes virtual refuse vehicle 11 to database 814 after every time virtual refuse vehicle 11 has been updated (e.g., an update to the graphical representation of virtual refuse vehicle 11 and/or an update to the information from any of chassis manager 816, body manager 818, and third party manager 820). Database 814 may store all of the data of virtual refuse vehicle 11 (e.g., the graphical representation of virtual refuse vehicle 11 and/or the information of virtual refuse vehicle 11 received from each of chassis manager 816, body manager 818, and third party manager 820) in computer code, tabular form, etc., and may store the data of virtual refuse vehicle 11 as historical data. In some embodiments, the historical data of virtual refuse vehicle 11 stored in database 814 may be accessed and output through output wireless radio 828 to any of remote database 810, personal computer device 316, ERP system 802, maintenance system 804, fleet management system 806, route planning system 808, and sales tool 812. In some embodiments, database 814 outputs the historical data of virtual refuse vehicle 11 based on a request from any of remote database 810, personal computer device 316, ERP system 802, maintenance system 804, fleet management system 806, route planning system 808, sales tool 812, and a network.

Referring still to FIG. 9, remote server 320 is shown outputting information regarding virtual refuse vehicle 11 to at least one of remote database 810, personal computer device 316, ERP system 802, maintenance system 804, fleet management system 806, route planning system 808, and sales tool 812. In some embodiments, remote server 320 outputs the graphical representation and/or the information of virtual refuse vehicle 11 to at least one of remote database 810, personal computer device 316, ERP system 802, maintenance system 804, fleet management system 806, route planning system 808, sales tool 812. Personal computer device 316 is shown displaying a graphical representation 836 of virtual refuse vehicle 11, as well as historical data of virtual refuse vehicle 11, according to some embodiments.

Referring still to FIG. 9, remote server 320 is shown outputting information regarding virtual refuse vehicle 11 to remote database 810, according to some embodiments. Remote database 810 may be configured to receive the information regarding virtual refuse vehicle 11 (e.g., the graphical representation of virtual refuse vehicle 11 and/or the information of virtual refuse vehicle 11 received from each of chassis manager 816, body manager 818, and third party manager 820) and store the information regarding virtual refuse vehicle 11. Remote database 810 may include any volatile or non-volatile computer-readable storage medium capable of storing data.

Remote server 320 may also be configured to receive the mapping from the controller 300. Remote server 320 can use the mapping and/or vehicle identification number to provide particular data (e.g., processed or unprocessed vehicle data, time-series data, etc.) to a user in response to receiving a request from a user device (e.g., personal computer device 316) or a system (e.g., ERP system 802, maintenance system 804, fleet management system 806, route planning system 808, sales tool 812, etc.) to view data obtained from a particular sensor, system, device, etc., of refuse vehicle 10. In some embodiments, the user may provide a request (e.g., via personal computer device 316) to view additional, detailed, or historical information regarding a particular refuse vehicle of a fleet of refuse vehicles, a particular system, sub-system, electronic control system, device, sensor, or a particular type of data (e.g., location and/or velocity) of a particular refuse vehicle. Remote server 320, or more particularly processor 826 or processing circuit 824, can be configured to provide the requested data to the user (e.g., via personal computer device 316) by using the mapping to retrieve the requested data (e.g., from database 814, from controller 300, etc.).

Figure 10:
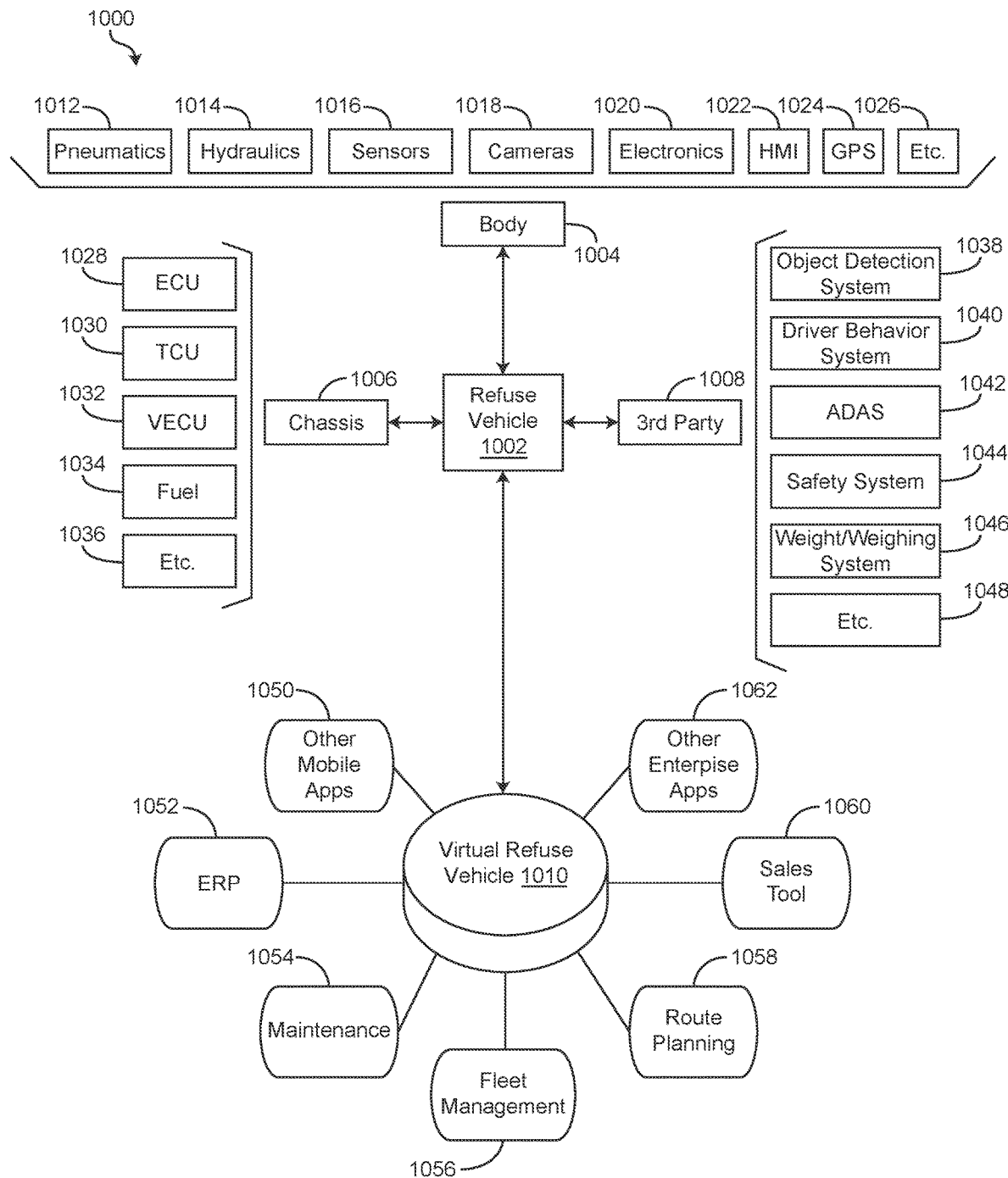
FIG. 10 is a diagram of a virtual refuse vehicle system, according to an exemplary embodiment.

Referring now to FIG. 10, a representation of a virtual refuse vehicle system 1000 is shown, according to an illustrative embodiment. Virtual refuse vehicle system is shown to include a refuse vehicle 1002, configured to communicate with a virtual refuse vehicle 1010. In some embodiments, refuse vehicle 1002 is configured to communicate with virtual refuse vehicle 1010 through a controller (e.g., controller 300) or a transceiver. Refuse vehicle 1002 is shown collecting/monitoring information grouped into body information 1004, chassis information 1006, and third party information 1008, according to some embodiments. In some embodiments, chassis information 1006 includes any information regarding a chassis of refuse vehicle 1002 such as an ECU 1028, TCU 1030, Virtual Engine Control Unit (VECU) 1032, fuel 1034, and other chassis information 1036. Body information 1004 includes any information regarding a body of refuse vehicle 1002 such as pneumatics 1012, hydraulics 1014, sensors 1016, cameras 1018, electronics 1020, Human Machine Interface (HMI) 1022, GPS 1024, and other body information 1026. Third party information 1008 includes any information regarding a third party system of refuse vehicle 1002 such as an object detection system 1038, a driver behavior system 1040, an Advanced Driver Assistance System (ADAS) 1042, a safety system 1044, a weight/weighing system 1046, and any other third party systems 1048. Refuse vehicle 1002 may transmit any of the body information 1004, chassis information 1006, and third party information 1008 to virtual refuse vehicle 1010. Virtual refuse vehicle 1010 may be a digital twin of refuse vehicle 1002, and may include a graphical representation of refuse vehicle 1002, as well as including any of the body information 1004, chassis information 1006, and third party information 1008 of refuse vehicle 1002, according to some embodiments.

Virtual refuse vehicle 1010 may be stored on a remote server (e.g., remote server 320), and may be configured to be accessed by a variety of applications/systems/devices, such as any enterprise application 1062, sales tool 1060, route planning system 1058, fleet management system 1056, maintenance system 1054, Enterprise Resource Planning (ERP) system 1052, and any other mobile applications 1050 (e.g., a personal computer device). In some embodiments, sales tool 1060 is sales tool 812, route planning system 1058 is route planning system 808, fleet management system 1056 is fleet management system 806, fleet management system 1056 is fleet management system 806, maintenance system 1054 is maintenance system 804, ERP system 1052 is ERP system 802, and other mobile applications 1050 are at least one of remote database 810 and personal computer device 316, such that whatever is said of sales tool 1060, route planning system 1058, fleet management system 1056, maintenance system 1054, Enterprise Resource Planning (ERP) system 1052, and other mobile applications 1050, may be said of sales tool 812, route planning system 808, fleet management system 806, maintenance system 804, ERP system 802, and at least one of remote database 810 and personal computer device 316, respectively, and vice versa. In some embodiments, refuse vehicle 1002 is at least one of refuse vehicle 10 and controller 300, such that whatever is said of refuse vehicle 1002 may be said of at least one of refuse vehicle 10 and controller 300 and vice versa.

In some embodiments, virtual refuse vehicle 1010 may represent more than one refuse vehicle (e.g., a fleet of refuse vehicles) and may represent a graphical representation and information pertaining to each of the refuse vehicles which define the fleet of refuse vehicles. In some embodiments, sales tool 1060 may be configured to analyze virtual refuse vehicle 1010 or historical information of virtual refuse vehicle 1010 for any sales applications. In some embodiments, route planning 1058 is configured to analyze virtual refuse vehicle 1010 or historical information of virtual refuse vehicle 1010 to determine route changes for refuse vehicle. In some embodiments, fleet management system 1056 may be configured to analyze virtual refuse vehicle 1010 to determine and generate information regarding the fleet of refuse vehicles and determine decisions regarding the fleet of refuse vehicles (e.g., increase the number of refuse vehicles which define the fleet). In some embodiments, maintenance system 1054 is configured to analyze virtual refuse vehicle 1010 to identify if refuse vehicle 1002 or one of the refuse vehicles of the fleet require maintenance. In some embodiments, ERP system 1052 is configured to analyze virtual refuse vehicle 1010 to determine upgrades and changes in deployment of refuse vehicle 1002 or to determine upgrades and changes to the fleet. In some embodiments, other mobile applications 1050 may access virtual refuse vehicle 1010, to display, analyze, monitor, and/or store virtual refuse vehicle 1010 (e.g., other mobile applications 1050 may be a personal computer device or a remote database). In some embodiments, any other enterprise applications 1062 may access virtual refuse vehicle 1010 to analyze, monitor, store, make decisions based on, etc., virtual refuse vehicle 1010.

Referring now to FIG. 11, a set of data 1100 for a fleet of refuse vehicles is shown, according to an illustrative embodiment. The set of data 1100 may be a live-view of the fleet of refuse vehicles, or may include historical data of the fleet of refuse vehicles. In some embodiments, the set of data 1100 is representative of information stored on any of virtual refuse vehicle 1010, remote server 320, database 814, and remote database 810, and may be accessed/monitored by any of personal computer device 316, ERP system 802, maintenance system 804, fleet management system 806, route planning system 808, sales tool 812, ERP system 1052, maintenance system 1054, fleet management system 1056, route planning system 1058, sales tool 1060, other mobile applications 1050, and other enterprise applications 1062. The set of data 1100 for the fleet of refuse vehicles is shown to include information regarding the status (and/or historical data) of multiple refuse vehicles (or vehicles), each having a unique vehicle ID number/value. The set of data 1100 is shown to include speed, latitude, longitude, fuel level, arm angle, and engine RPM information for each of the refuse vehicles having unique vehicle ID numbers/values. In some embodiments, the set of data 1100 may include time-series data, live data, and/or historical data of at least one virtual refuse vehicle. In some embodiments, the set of data 1100 includes any of the information retrieved/monitored by a controller (e.g., controller 300) of each of the refuse vehicles. For example, the set of data 1100 shows that vehicle ID No 111A153B1 is travelling at a speed of 55 mph, has a specific geographic location (e.g., latitude and longitude), a specific fuel level (e.g., 95.4%), a specific arm angle (e.g., 0 degrees), and a specific engine RPM (e.g., 2501 revolutions per minute). The set of data 1100 may be received, monitored, and analyzed by any of the above mentioned systems, devices, and/or applications.

For example, the maintenance system 1054 and/or the maintenance system 804 may analyze the set of data 1100 and determine that the engine RPM of a specific vehicle exceeds a maximum threshold value, and that the specific vehicle must be brought in for maintenance. In another example, a fleet management system (e.g., fleet management system 1056 and/or fleet management system 806) may analyze the set of data 1100 and monitor the geographic location (e.g., latitude and longitude) of each of the vehicles, and determine that a cost savings can be achieved by reducing the number of vehicles in a fleet, while still achieving the same benefits (e.g., still performing all of a number of routes of the fleet in a timely manner). In another example, the maintenance system (e.g., maintenance system 1054 and/or maintenance system 804) may monitor the arm angle of the vehicles and determine that a specific vehicle (e.g., vehicle 111A154C8) has an arm malfunction since the arm angle of the specific vehicle has not returned to a rest point (e.g., 0 degrees) over the course of a route of the specific vehicle or while being driven (e.g., the arm angle has not returned to the rest point of 0 degrees but is still being driven at a speed greater than 0 mph).

Figure 12:
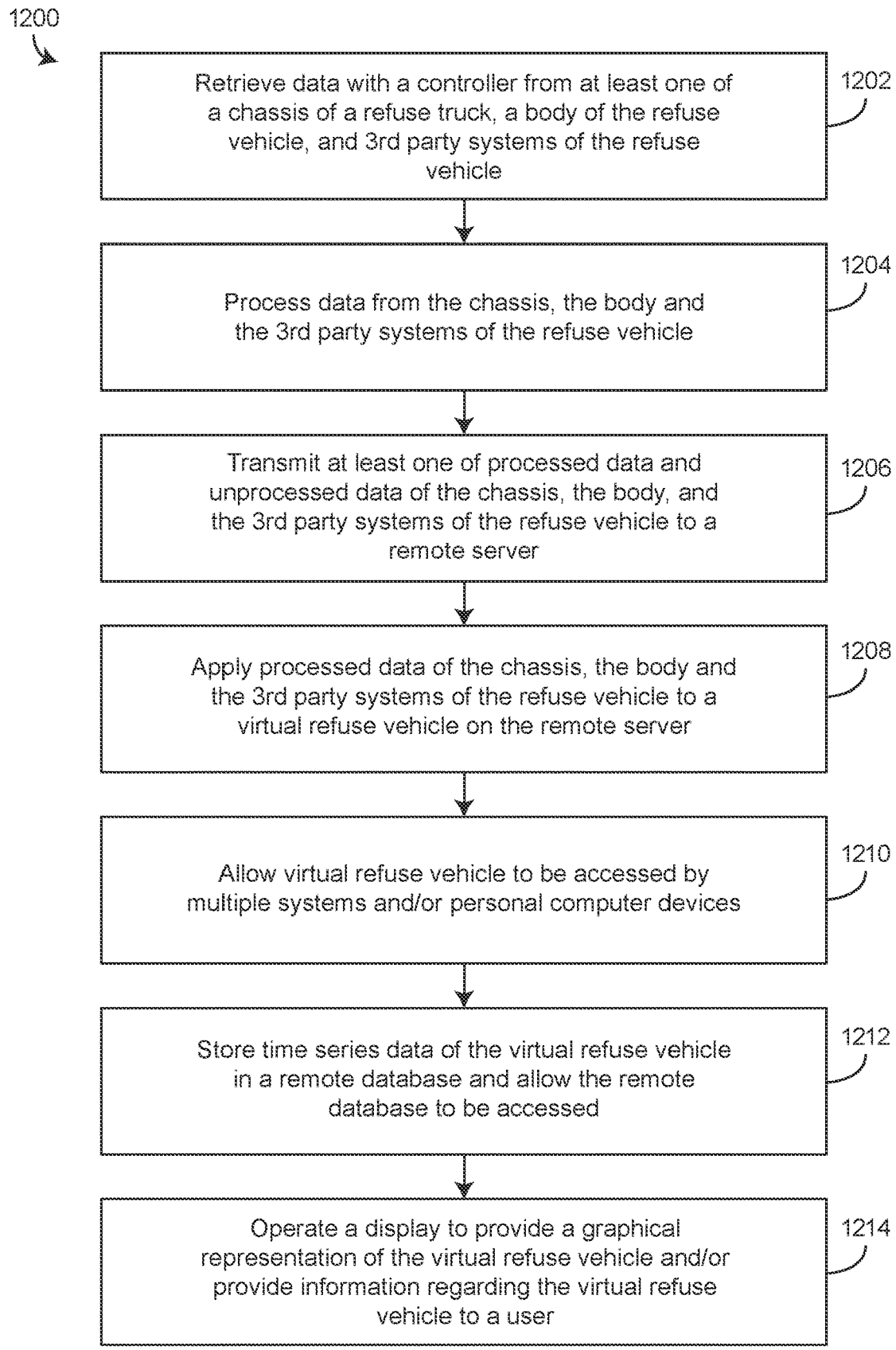
FIG. 12 is a method for collecting data on a vehicle and generating a digital twin of the vehicle, according to an exemplary embodiment.

Referring now to FIG. 12, a process 1200 for collecting data from at least one vehicle (e.g., a refuse vehicle) and generating a virtual vehicle (e.g., a virtual refuse vehicle) is shown, according to an exemplary embodiment. Process 1200 includes steps 1202-1212, according to some embodiments. Process 1200 can be performed by controller 300, virtual refuse vehicle system 1000, virtual refuse vehicle system 900, virtual refuse vehicle system 800, etc. Process 1200 facilitates data storage and retrieval by using a virtual refuse vehicle (e.g., a data object) that may include visualizations or provide desired data to a user in response to a request.

Process 1200 includes retrieving data with a controller from at least one of a chassis of a refuse vehicle, a body of the refuse vehicle and a third party system of the refuse vehicle (step 1202), according to some embodiments. Step 1202 may be performed by controller 300 in conjunction with any of the above mentioned systems/devices/sensors which controller 300 may be configured to retrieve/receive information/data from or which controller 300 can operate or with which controller 300 communicates. For example, step 1202 can include retrieving chassis information 1006 from any of, or regarding any of, an ECU 1028, a TCU 1030, a VECU 1032, fuel 1034 (e.g., from a fuel sensor, or any of the aforementioned systems), or any other chassis information 1036 (shown in FIG. 10). Step 1202 can also include retrieving or receiving third party information 1008 from any of object detection system 1038, driver behavior system 1040, ADAS 1042, safety system 1044, weight/weighing system 1046, and any other third party systems 1048 (shown in FIG. 10).

Process 1204 includes processing the data from the chassis, the body, and the third party system of the refuse vehicle (step 1204) and transmitting at least one of the processed and/or unprocessed data of the chassis, the body, or the third party systems of the refuse vehicle to a remote server (step 1206), according to some embodiments. Step 1204 may include determining time-series data of any of the information/data from the chassis, the body, and at least one of the third party systems of the refuse vehicle. Step 1204 may be performed by at least one of controller 300, and remote server 320, according to some embodiments. Step 1206 may be performed by controller 300, configured to communicably connect with remote server 320 to transmit any of the above mentioned data to remote server 320, according to some embodiments.

Step 1206 may also include transmitting any of the above mentioned data to a personal computer device (e.g., personal computer device 316), according to some embodiments. In some embodiments, personal computer device 316 is a technician computer device and is configured to communicably connect with controller 300 to receive any of the above mentioned information via at least one of a Bluetooth connection, a Zigbee connection, and/or any other wireless transmission.

Process 1200 includes applying and/or generating a virtual refuse vehicle with the processed data (step 1208), according to some embodiments. Step 1208 may be performed by remote server 320, or by one or more modules of remote server 320, according to some embodiments. The virtual refuse vehicle may be a data object that includes a visualization, a graphical representation, etc., of an actual refuse vehicle. The virtual refuse vehicle may be a model of the actual refuse vehicle or a display object that can include or store various sensor or operational data of the actual refuse vehicle as obtained from various sensors, systems, etc., of the actual refuse vehicle.

Process 1200 includes allowing the virtual refuse vehicle to be accessed by multiple systems and/or personal computer devices (step 1210), according to some embodiments. Step 1210 may be performed by any of remote server 320 and remote database 810, according to some embodiments. Step 1210 can include establishing communication (e.g., wireless communication) between the controller and the various systems and/or personal computer devices or a remote sever. For example, the remote server may store the virtual refuse vehicle, establish communication with the various personal computer devices and provide the virtual refuse vehicle to the various personal computer devices.

Process 1200 includes storing time series data of the virtual refuse vehicle in a remote database and allowing the remote database to be accessed (step 1212), according to some embodiments. Step 1212 may be performed by remote server 320, remote database 810, and/or controller 300, according to some embodiments. Step 1212 can include storing the virtual refuse vehicle at the remote database as well as any other information relating to the virtual refuse vehicle (e.g., graphical representation data, 3d objects, time-series data, real-time sensor data, historical data, operational data, manufacturer data, part number data, serial numbers, etc.). Step 1212 can include allowing ERP system 1052, maintenance system 1054, fleet management system 1056, route planning system 1058, sales tool 1060, other enterprise applications 1062, or other mobile applications 1050 to access the virtual refuse vehicle or the information relating to or regarding the virtual refuse vehicle so that such systems, tools, applications, etc., may use the information to perform their corresponding functionality or analyze the information of the virtual refuse vehicle.

Process 1200 includes operating a display to provide a graphical representation of the virtual refuse vehicle and/or providing information regarding the virtual refuse vehicle to a user (step 1214), according to some embodiments. Step 1214 can include operating personal computer device 316, or any other display device to provide the graphical representation of the virtual refuse vehicle to the user in addition to any information relating to the virtual refuse vehicle.

Referring now to FIG. 13, a system, shown as virtual refuse vehicle system 1300 is shown, according to some embodiments. Virtual refuse vehicle system 1300 is shown to include a controller, shown as controller 1308 receiving data from a variety of inputs, such as a chassis system input, shown as ECU 1306, and sensor input, shown as sensors 1302, according to some embodiments. Controller 1308 is also shown outputting commands (e.g., control signals) to controllable devices, shown as actuators 1304, and ECU 1306 (or any other controllable chassis system), according to some embodiments. Controller 1308 is shown communicably connected with a user interface, shown as touch display 1310 according to some embodiments. In some embodiments, controller 1308 may also receive information or send commands (e.g., control signals) to/from a third party system. In some embodiments, sensors 1302 are any of the inputs described above in greater detail with reference to FIGS. 1-6 (e.g., any of the body inputs). In some embodiments, actuators 1304 are any of the controllable devices described above in greater detail with reference to FIGS. 1-6. In some embodiments, ECU 1306 is any vehicle systems (e.g., ECU, TCU, etc.), described in greater detail above with reference to FIGS. 1-6. In some embodiments, controller 1308 and/or touch display 1310 is/are controller 300 and is/are configured to perform any of the operation of controller 300, described in greater detail above with reference to FIGS. 1-6. In some embodiments, controller 1308 and/or touch display 1310 is/are configured to perform any or all of the operations of remote server 320, described above in greater detail with reference to FIGS. 8-9. For example, controller 1308 and/or touch display 1310 may be configured to generate virtual refuse vehicle 11, and store at least one of a present status of virtual refuse vehicle 11 and historical status/operation of virtual refuse vehicle 11 locally.

Touch display 1310 may be configured to display a graphical representation of virtual refuse vehicle 11 to a user and allow the user to monitor a present operational status of virtual refuse vehicle 11, or to view historical data of virtual refuse vehicle 11. In some embodiments, touch display 1310 may be configured to receive a command from a user and adjust an operation of refuse vehicle 11 through controller 1308. Touch display 1310 may be further configured to transmit any information regarding virtual refuse vehicle 11 (e.g., a present operational status, historical data, a graphical representation, etc.), to a database, shown as database 1312.

In some embodiments, touch display 1310 includes wireless radio 318 and functions similarly to controller 300, as described in greater detail above with reference to FIG. 3. Touch display 1310 may further be configured to facilitate a graphical and data-oriented representation of virtual refuse vehicle 11 to the user, and allow the user to monitor and/or control refuse vehicle 10 through virtual refuse vehicle 11, according to some embodiments. In some embodiments, touch display 1310 includes a processing circuit, processor, and memory, and acts as a high-level controller and a user interface.

In some embodiments, controller 1308 is controller 300 and is configured to instantiate a virtual refuse vehicle 11 as a virtual refuse data structure (e.g., an object) using object oriented programming. In some embodiments, the virtual refuse data structure is a standard data template and includes a variety of smaller objects. For example, virtual refuse data template may include various classes of smaller objects (e.g., a fuel system, a chassis, an ECU, a TCU, sensors, etc.). Each of the objects included in virtual refuse vehicle 11 may include a specific value, set of values, historical data, attributes, methods, etc., relevant to an operation or historical operation of each of an object of the refuse vehicle 10, according to some embodiments. In some embodiments, the virtual refuse vehicle 11 may be provided to a variety of other applications (as described in greater detail above with reference to FIGS. 8-10), through a common interface (e.g., APIs), allowing the variety of other applications to access and interact with the virtual refuse vehicle 11 without requiring the variety of other applications to process the instantiating of the virtual refuse vehicle 11 or be provided access to a specific physical make-up of the refuse vehicle 10.

In some embodiments, virtual refuse vehicle 11 may be stored locally in any of controller 1308, controller 300, touch display 1310, etc., similarly to storage in remote server 320 as describe in greater detail above with reference to FIG. 9. In some embodiments, any of controller 1308, controller 300, touch display 1310, etc., immediately transmit virtual refuse vehicle 11, or any information relevant to virtual refuse vehicle 11 to another storage device or application.

The invention of the present disclosure provides many advantages and benefits. The invention may provide a unified data collection system for a vehicle (e.g., a refuse vehicle), which monitors and receives information/data from any modules, computer systems, devices, and sensors present on the vehicle. For example, the unified data collection system may communicably connect with a vehicle bus and may collect/transmit information from the vehicle bus. The present invention also discloses processing information from the unified data collection system into meaningful data (e.g., time series data) which may be transmitted to a remote server or device and used to generate a digital twin. The digital twin may include all of the data/information collected by the unified data collection system and may further include a graphical representation of the vehicle and historical information of the vehicle. The digital twin may be stored on the remote server, and may be easily accessed by a variety of business systems, maintenance systems, enterprise systems, etc., in order to provide detailed insight into various aspects of the vehicle or a fleet of vehicles. Additionally, the digital twin and historical information may be used to make more informed decisions regarding business, maintenance, or enterprise decisions regarding the vehicle or the fleet of vehicles.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A system for digital twinning a refuse vehicle, the system comprising:
 a refuse vehicle; and
 a controller configured to:
  receive a plurality of datasets from the refuse vehicle;
  generate a virtual refuse vehicle based on the plurality of datasets, the virtual refuse vehicle comprising a visual representation of the refuse vehicle and the plurality of datasets; and
  operate a display of a user device to provide the visual representation of the refuse vehicle and one or more of the plurality of datasets to a user.

2. The system of claim 1, wherein:
 one or more of the plurality of datasets relate to chassis information of the refuse vehicle;
 one or more of the plurality of datasets relate to body information of the refuse vehicle; and
 one or more of the plurality of datasets relate to third party information of the refuse vehicle.

3. The system of claim 1, wherein the refuse vehicle comprises a sensor, a device, and an electronic control system;

wherein the controller is configured to receive the plurality of datasets from at least one of the sensor, the device, or the electronic control system of the refuse vehicle;
wherein each of the plurality of datasets is mapped to one of the sensor, the device, or the electronic control system.

4. The system of claim 1, wherein the controller is configured to:
convert the plurality of datasets from the refuse vehicle to time-series data; and
generate the virtual refuse vehicle based on the time-series data.

5. The system of claim 1, wherein the virtual refuse vehicle comprises current data and historical data received from at the refuse vehicle.

6. The system of claim 5, wherein the controller is configured to operate the display of the user device to provide the current data or the historical data received from the refuse vehicle in response to receiving a user input at the user device.

7. The system of claim 1, wherein the controller is configured to:
receive a user command to adjust an operation of the refuse vehicle from the user device;
generate control signals for a corresponding of the electronic control system; and
operate the refuse vehicle using the control signals.

8. A method for displaying information of a refuse vehicle, the method comprising:
obtaining a plurality of datasets from a refuse vehicle;
generating a digital twin of the refuse vehicle, the digital twin comprising:
the plurality of datasets; and
a graphical representation of the refuse vehicle;
receiving a request, at a user device, to display the digital twin of the refuse vehicle; and
operating a display of the user device to provide the graphical representation of the refuse vehicle and one or more of the plurality of datasets in response to the request.

9. The method of claim 8, wherein the plurality of datasets comprise current operational and historical operational data of the refuse vehicle.

10. The method of claim 8, further comprising providing the virtual refuse vehicle to at least one of:
a sales tool;
a route planning system;
a fleet management system;
a maintenance system; or
an enterprise resource planning system.

11. The method of claim 8, wherein the refuse vehicle comprises a sensor, a device, and an electronic control system;
wherein the plurality of datasets of the refuse vehicle are obtained from the sensor, the device, or the electronic control system;
wherein each of the plurality of datasets is mapped to one of the sensor, the device, or the electronic control system.

12. The method of claim 11, further comprising:
receiving a request, at the user device, to display data relating to a specific sensor, a specific device, or a specific system of the refuse vehicle; and
operating the display to provide one or more of the plurality of datasets that correspond to the specific sensor, the specific device, or the specific system of the refuse vehicle.

13. The method of claim 8, wherein the plurality of datasets are obtained from:
a chassis sensor, a chassis device, or a chassis system of the refuse vehicle;
a body sensor, a body device, or a body system of the refuse vehicle; and
a third party sensor, a third party device, or a third party system of the refuse vehicle.

14. The method of claim 13, wherein the body sensor, the body device, or the body system of the refuse vehicle comprise any of:
a sensor for a pneumatic device of the refuse vehicle;
a sensor for a hydraulic device of the refuse vehicle;
a camera;
a human machine interface (HMI); or
a global positioning system (GPS).

15. The method of claim 13, wherein the third party sensor, the third party device, or the third party system of the refuse vehicle comprise any of:
an object detection system;
a driver behavior system;
an advanced driver assistance system (ADAS);
a safety system; or
a weighing system.

16. The method of claim 8, further comprising:
receiving a command, at the user device, to adjust an operation of a system of the refuse vehicle;
generating control signals for the system of the refuse vehicle in response to the command; and
operating the system of the refuse vehicle according to the control signals.

17. A cloud computing system for a plurality of refuse vehicles, the cloud computing system comprising:
a cloud device comprising a processor configured to:
wirelessly communicate with a plurality of refuse vehicle controllers to obtain operational data of each of the plurality of refuse vehicles, each of the plurality of refuse vehicle controllers positioned locally at a corresponding refuse vehicle; and
generate a digital twin for each of the plurality of refuse vehicles using the operational data, the digital twin comprising a graphical representation of the corresponding refuse vehicle; and
a user device comprising a processor and a display, the processor of the user device configured to:
receive one or more of the digital twins from the processor of the cloud device; and
operate the display of the user device to provide the graphical representation of the one or more digital twins and the operational data that corresponds to the one or more digital twins.

18. The cloud computing system of claim 17, wherein the processor of the cloud device is configured to store the plurality of digital twins in a database.

19. The cloud computing system of claim 17, wherein the operational data of each of the plurality of refuse vehicles is time-series data collected by the controllers of the refuse vehicles from sensors, systems, or devices of the refuse vehicle over a time period.

20. The cloud computing system of claim 17, wherein the processor of the cloud device is configured to provide any of the plurality of digital twins to at least one of:
a sales tool;

a route planning system;
a fleet management system;
a maintenance system; or
an enterprise resource planning system.

\* \* \* \* \*